(12) United States Patent
Hoofard et al.

(10) Patent No.: US 7,062,813 B2
(45) Date of Patent: Jun. 20, 2006

(54) SUPPORT LEG SYSTEM AND METHOD FOR SUPPORTING A DOCK LEVELER

(75) Inventors: Richard K. Hoofard, Dallas, TX (US); James C. Alexander, Coppell, TX (US); Douglas H. Massey, New Berlin, WI (US); Michael M. Meichtry, Brookfield, WI (US)

(73) Assignee: SPX Dock Products, Inc., Sussex, WI (US)

(*) Notice: Subject to any disclaimer, the term of this patent is extended or adjusted under 35 U.S.C. 154(b) by 24 days.

(21) Appl. No.: 10/717,575

(22) Filed: Nov. 21, 2003

(65) Prior Publication Data

US 2004/0177457 A1  Sep. 16, 2004

Related U.S. Application Data

(63) Continuation-in-part of application No. 10/385,751, filed on Mar. 12, 2003, now Pat. No. 6,931,686.

(51) Int. Cl.
  *E01D 15/00* (2006.01)
(52) U.S. Cl. ........................ 14/69.5; 14/71.1
(58) Field of Classification Search ................ 14/69.5, 14/71.3
  See application file for complete search history.

(56) References Cited

U.S. PATENT DOCUMENTS

| | | | |
|---|---|---|---|
| 3,137,017 A * | 6/1964 | Pfleger et al. | 14/71.3 |
| 3,858,264 A | 1/1975 | Kuhns et al. | 14/71 |
| 3,887,102 A | 6/1975 | Artzberger | 14/71 |
| 3,902,213 A * | 9/1975 | Pfleger et al. | 14/71.3 |
| 3,995,342 A | 12/1976 | Wiener | 14/71.3 |
| 4,279,050 A | 7/1981 | Abbott | 14/71.3 |
| 4,328,602 A | 5/1982 | Bennett | 14/71.3 |
| 4,531,248 A | 7/1985 | Swessel et al. | 14/71.3 |
| 4,560,315 A | 12/1985 | Hahn et al. | 414/401 |
| 4,570,277 A | 2/1986 | Hahn et al. | 14/71.3 |
| 4,605,353 A | 8/1986 | Hahn et al. | 414/401 |
| 4,619,008 A * | 10/1986 | Kovach et al. | 14/71.7 |
| 4,634,334 A | 1/1987 | Hahn et al. | 414/401 |
| 4,692,755 A | 9/1987 | Hahn et al. | 340/687 |
| 4,744,121 A | 5/1988 | Swessel et al. | 14/71.7 |
| 4,819,770 A | 4/1989 | Hahn | 188/284 |
| 4,843,373 A | 6/1989 | Trickle et al. | 340/540 |
| 4,847,935 A | 7/1989 | Alexander | 14/71.3 |
| 4,865,507 A | 9/1989 | Trickle | 414/401 |
| 4,920,598 A | 5/1990 | Hahn | 14/71.1 |
| 4,995,130 A | 2/1991 | Hahn et al. | 14/71.3 |
| 5,040,258 A | 8/1991 | Hahn et al. | 14/71.3 |
| 5,111,546 A | 5/1992 | Hahn et al. | 14/71.3 |
| 5,212,846 A | 5/1993 | Hahn et al. | 14/69.5 |
| 5,271,183 A | 12/1993 | Hahn et al. | 49/360 |
| 5,311,628 A | 5/1994 | Springer et al. | 14/71.1 |
| 5,323,503 A | 6/1994 | Springer | 14/71.3 |
| 5,375,965 A | 12/1994 | Springer et al. | 414/786 |

(Continued)

OTHER PUBLICATIONS

Rite-Hite, AL-800 Powered Dock Leveler Owner's Manual, Jan. 2003, pp. 2–37.

*Primary Examiner*—Raymond W Addie
(74) *Attorney, Agent, or Firm*—Baker & Hostetler LLP

(57) ABSTRACT

An apparatus for supporting a dock leveler in a manner to reduce the effects of free fall and stump-out. The apparatus includes the use of a retractable support leg.

14 Claims, 23 Drawing Sheets

U.S. PATENT DOCUMENTS

| | | | |
|---|---|---|---|
| 5,440,772 A | 8/1995 | Springer et al. | 14/69.5 |
| 5,442,825 A | 8/1995 | Hahn et al. | 14/71.1 |
| 5,453,735 A | 9/1995 | Hahn | 340/687 |
| 5,531,557 A | 7/1996 | Springer | 414/401 |
| 5,546,623 A | 8/1996 | Hahn | 14/69.5 |
| 5,553,987 A | 9/1996 | Ellis | 414/401 |
| 5,582,498 A | 12/1996 | Springer et al. | 414/401 |
| 5,664,930 A | 9/1997 | Ellis | 414/401 |
| 5,702,223 A | 12/1997 | Hahn et al. | 414/401 |
| 5,713,072 A | 1/1998 | Marth et al. | 455/33.1 |
| 5,762,459 A | 6/1998 | Springer et al. | 414/401 |
| 5,813,072 A * | 9/1998 | Alexander | 14/71.1 |
| 5,882,167 A | 3/1999 | Hahn et al. | 414/401 |
| 5,964,572 A | 10/1999 | Hahn et al. | 414/800 |
| 6,010,297 A | 1/2000 | Hahn et al. | 414/401 |
| 6,065,172 A | 5/2000 | Swessel | 14/71.7 |
| 6,070,283 A | 6/2000 | Hahn | 14/71.1 |
| 6,074,157 A | 6/2000 | Hahn | 414/401 |
| 6,085,375 A * | 7/2000 | Holm | 14/71.7 |
| 6,092,970 A | 7/2000 | Hahn | 414/401 |
| 6,106,212 A | 8/2000 | Hahn | 414/401 |
| 6,116,839 A | 9/2000 | Bender et al. | 414/401 |
| 6,190,109 B1 | 2/2001 | Bender | 414/401 |
| 6,216,303 B1 * | 4/2001 | Massey | 14/71.3 |
| 6,220,809 B1 | 4/2001 | Hahn | 414/401 |
| 6,238,163 B1 | 5/2001 | Springer et al. | 414/401 |
| 6,276,016 B1 * | 8/2001 | Springer | 14/71.1 |
| 6,311,352 B1 | 11/2001 | Springer | 14/71.5 |
| 6,322,310 B1 | 11/2001 | Bender et al. | 414/401 |
| 6,360,394 B1 | 3/2002 | Hahn | 14/71.1 |
| 6,368,043 B1 | 4/2002 | Leum | 414/401 |
| 6,431,819 B1 | 8/2002 | Hahn | 414/809 |
| 6,627,016 B1 | 9/2003 | Abare et al. | 156/64 |
| 6,820,295 B1 * | 11/2004 | Webster | 14/69.5 |
| 2004/0117926 A1 * | 6/2004 | Massey | 14/71.1 |
| 2004/0177455 A1 * | 9/2004 | Hoofard et al. | 14/71.1 |
| 2004/0177456 A1 * | 9/2004 | Hoofard et al. | 14/71.3 |

* cited by examiner

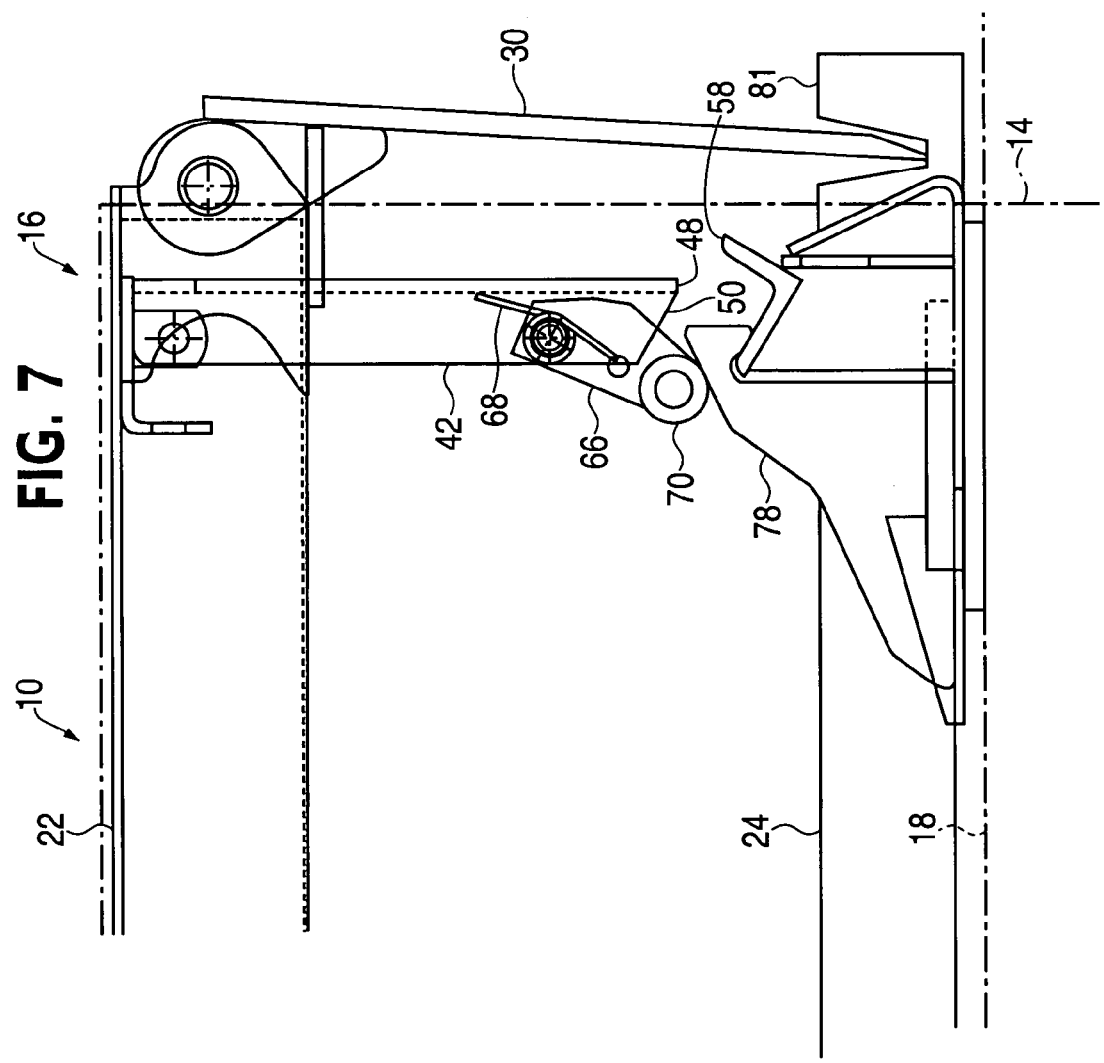

SUPPORT LEG SYSTEM AND METHOD FOR SUPPORTING A DOCK LEVELER

CLAIM OF PRIORITY

This application is a Continuation-In-Part of the non-provisional U.S. patent application entitled Support Leg System and Method for Supporting a Dock Leveler, having Ser. No. 10/385,751, and filed Mar. 12, 2003, now U.S. Pat. No. 6,931,686, the disclosure of which is hereby incorporated by reference in its entirety.

FIELD OF THE INVENTION

The present invention relates generally to dock levelers. More particularly, the present invention relates to a method and apparatus for providing support legs for a dock lever configured to reduce the effects of stump-out and free fall.

BACKGROUND OF THE INVENTION

Dock levelers are mounted in loading docks and are used to bridge a gap between a loading dock and the end of a vehicle parked at the loading dock. For example, trucks or tractor trailers may be loaded and unloaded at loading docks with the help of a dock leveler. The dock leveler enables material handling equipment such as a fork lift to move between the dock and the vehicle bed. Because not all vehicle beds are of the same height, many dock levelers are configured to pivot up and down in order to adjust and create a bridge between the loading dock and the vehicle bed. Typical dock levelers include a ramp portion. In addition, dock levelers may include a lip mounted at the end of the ramp. When a vehicle backs up to the dock, often the lip is extended and rests directly on the bed of the vehicle. Some dock levelers use the bed of the vehicle as a support for the lip and the ramp so that vehicles, such as fork lifts, material, and operators may move between the vehicle bed and the dock.

If a vehicle, whose bed is supporting the dock leveler and load (e.g. fork lift, material, dock worker), were to pull away from the dock, the dock leveler may become unsupported and move rapidly down to a low position under the influence of gravity and strike the support structure in the pit of the dock leveler. This condition is known in the industry as free fall. Free fall can have unpleasant consequences when dock workers or material handling vehicles such as fork lifts are on the dock leveler during a time when free fall occurs. In order to mitigate the effects of free fall, many dock levelers are equipped with various devices in order to limit or negate the effects of free fall.

One such device used to limit the effects of free fall is a support structure known as a support leg. A dock leveler may have one or more support legs. Often a dock leveler has a pair of support legs. Many support legs are configured so that they support the dock leveler at dock level, (a position where the ramp is level with the surrounding loading dock). When vehicles back up to a loading dock with the bed of the vehicle located at dock level or above, the dock leveler may be raised, the lip extended, and the dock leveler lowered until the lip rests on the bed of the vehicle. If the vehicle has a bed located above dock level, the support legs may be slightly above a corresponding support structure configured to support the support legs. Thus, if free fall occurs, the support legs will only permit the dock leveler to fall a limited amount before the support legs engage their support structure.

One problem associated with support legs is that if a vehicle with a bed located below dock level backs up to the dock, the support legs must be retracted to allow the ramp to lower until the lip rests on the bed of the vehicle. If the support legs are not retracted, the deck will be supported at dock level and the lip will fall to rest on the bed of the vehicle. Thus the angle of the lip relative to the vehicle bed will be steeper than normal. This condition of the support legs preventing the deck from being lowered is known in the industry as stump-out.

Stump-out can also occur as a vehicle is loaded. For example, the support legs may initially be above their support structure when the vehicle first backs up to a dock leveler. But as the vehicle is loaded and becomes heavier, the vehicle suspension may deflect due to the increasing load. As the vehicle bed becomes lower and lower the support legs may engage the support structure thus causing stump-out.

Stump-out can also occur when the support legs are still slightly above the corresponding support structure. As a fork truck moves in and out of the vehicle, deflection of the vehicle suspension will cause the vehicle and the dock leveler to move up and down several inches and cause the support legs to impact the corresponding support structure.

Stump-out can cause a variety of problems. For example, the steep angle of lip may inhibit material handling equipment such as a fork lift, from exiting the vehicle. The steep ramp may also cause the counterweight of a fork lift to impact the lip causing damage to the dock leveler, and potential injury to the fork lift driver. When stump-out is caused by deflection of the vehicle suspension, the repeated pounding of the support legs on the corresponding support structure can cause structural damage to the dock leveler and to the concrete pit that supports the dock leveler.

In order to avoid stump-out many dock levelers include retractable support legs that maintain the ramp in a substantially horizontal position when the ramp is not in use (i.e., when the dock leveler is not engaged with the truck bed). These legs can be retracted for servicing truck beds that are below dock level. Typically a pair of support legs are pivotally attached to the ramp near the lip hinge and extend downwardly to engage a supporting sub frame. These support legs may be spring biased forward toward a supporting position and may be retracted to a non-supporting position by one of several means.

Both manual and automatic mechanisms have been used to retract support legs. Manual support leg retraction mechanisms may require an operator to engage a mechanism, for example, by pulling a chain to retract the support legs as the ramp is being lowered. Automatic support leg retraction mechanisms typically retract the support legs as the lip of the dock leveler is extended. In this way the support leg is retracted when the lip engages a truck. However, retracting the support legs with manual mechanisms may require additional labor when trying to mate the dock lever to the truck, and retracting the support legs with automatic mechanisms may add complexity to the dock leveler.

Accordingly, a dock leveler that is able to deal with the problems of free fall and stump-out while at the same time reducing the amount of labor and complexity of a dock leveler is desired.

SUMMARY OF THE INVENTION

The foregoing needs are met, to a great extent, by the present invention, wherein in one aspect an apparatus is provided that in some embodiments include a dock leveler that reduces the problems of free fall and stump-out while at the same time reducing the amount of labor and complexity that can be associated with current dock levelers.

In accordance with one embodiment of the present invention, a support system for a dock leveler having a ramp and lip is provided. The support system includes: a support leg apparatus attached to the ramp, the support leg apparatus comprising a support leg; a camming surface biased to a first raised position and movable to a deflected lowered position when the ramp descends at least as fast as a predetermined rate. The support leg apparatus engages the camming surface, wherein the camming surface is configured to remain in the first position when the ramp descends slower than a predetermined rate. A lip holder is configured to cause the camming surface to move to the deflected position when the ramp descends at any rate and when the lip engages the lip holder.

In accordance with another embodiment of the present invention, a support system for a dock leveler having a ramp is provided. The support system includes: a support leg attached to the ramp, a camming surface, and a cam aligned to engage the camming surface. The cam is movably attached to said support leg such that the cam is configured to move substantially linearly from a first position to a second position when the ramp descends at least as fast as a predetermined rate. The cam engages the camming surface, so that the cam is biased to said first position and is configured to maintain the first position when the ramp descends slower than the predetermined rate.

In accordance with another embodiment of the present invention, a support system for a dock leveler having a ramp and a lip is provided. The system includes: means for supporting the ramp attached to the ramp, said supporting means having a support leg, means for camming biased to a first raised position and movable to a deflected lowered position when the ramp descends at least as fast as a predetermined rate. The supporting means engages the camming means, and the camming means is configured to remain in the first position when the ramp descends slower than a predetermined rate. The means for holding the lip is configured to cause said camming means to move to the deflected position when the ramp descends at any rate and when the lip engages said lip holding means.

In accordance with another embodiment of the invention, a support system for a dock leveler having a ramp is provided. The support system includes: means for supporting the ramp attached to the ramp, means for camming, and engaging means aligned to engage said camming means. The means for camming is movably attached to said supporting means such that said engaging means is configured to move substantially linearly from a first position to a second position when the ramp descends at least as fast as a predetermined rate and said engaging means engages said camming means, wherein said engaging means is biased to said first position and is configured to maintain said first position when the ramp descends slower than the predetermined rate.

In accordance with yet another embodiment of the present invention, a method of operating a dock leveler is described. The method includes the steps of: providing a dock leveler with a support leg biased to a supporting position, configuring the dock leveler to retract the support leg when the dock leveler descends slower than a predetermined speed by moving a cam along a camming surface, and configuring the dock leveler to maintain the support leg in the supporting position when the dock leveler descends faster than a predetermined speed by moving an axle supporting the cam along a slot.

In accordance with yet another embodiment of the present invention, a method of disengaging a support leg retraction apparatus of a dock leveler is described. The method includes the steps of: configuring the dock leveler to deflect a camming surface with a lip portion of the dock leveler when the lip is in the pendant position and the dock leveler is being lowered.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 7 is a side view of a dock leveler where the ramp is supported in the dock level position by a lip keeper.

DETAILED DESCRIPTION

Figure 1:
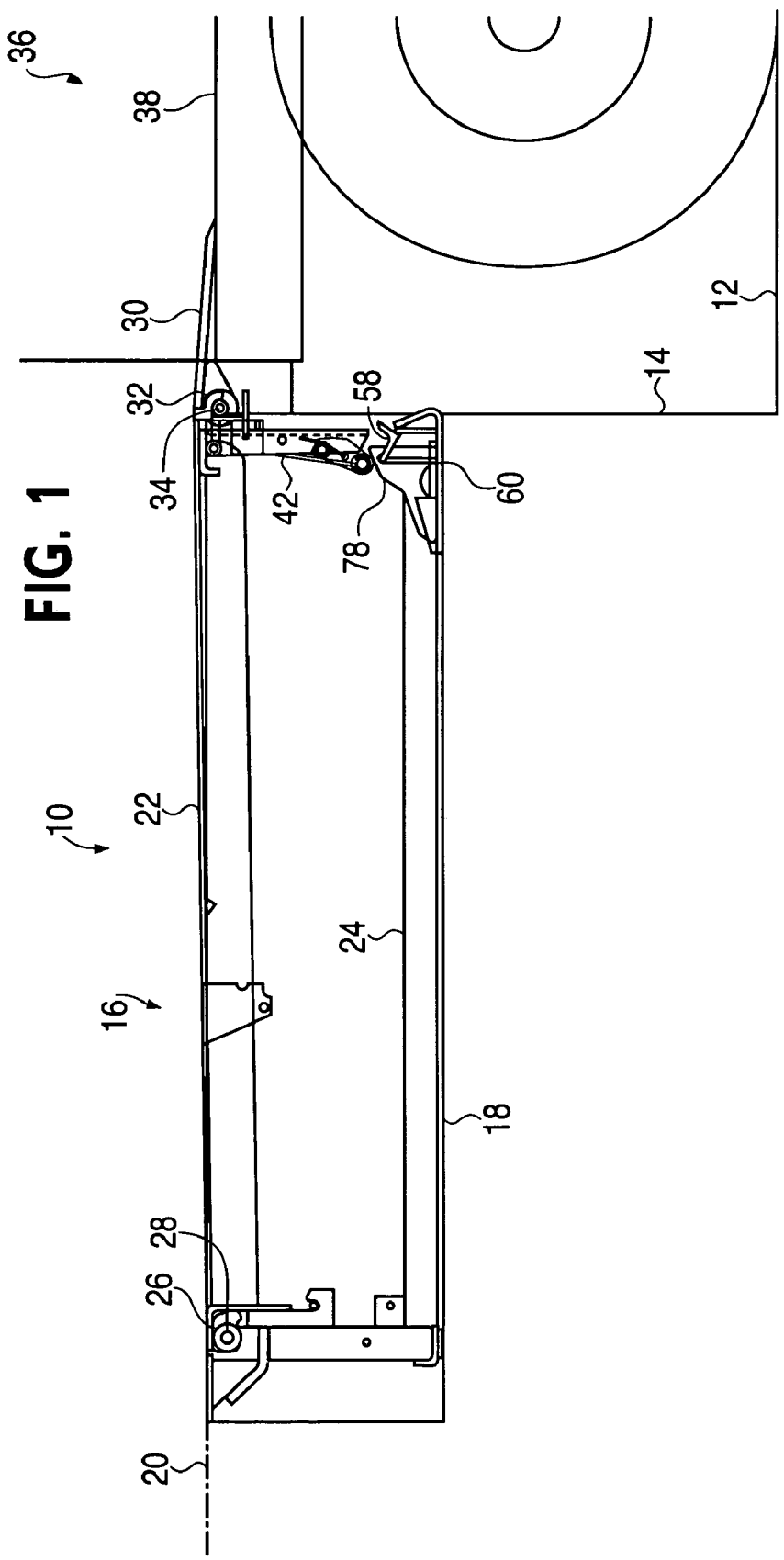
FIG. 1 is a side view illustrating a dock leveler according to a preferred embodiment of the invention.

The invention will now be described with reference to the drawing figures in which like reference numerals refer to like parts throughout. An embodiment in accordance with the present invention provides a dock leveler having support legs configured to support the ramp when the support legs are in a supporting position. The support legs are configured to retract allowing the ramp to move to a below dock level position. The support legs, when attached to a support leg moving assembly, are configured to move the support legs to a retracted position when the ramp moves to a fully lowered position at a relatively slow rate. For the purpose of this document, the fully lowered position of the dock leveler ramp is when the ramp is moved to the lowest position it can achieve. The support leg moving assembly is configured to not move the support legs to the retracted position when the ramp is moving to a lowered position at a relatively fast rate for example, when the ramp is in free fall.

The support legs move to a retracted position when the dock leveler ramp is being slowly moved to a below dock level position, yet if the ramp is in a free fall condition the support legs are left in the support position and thus minimize the amount of free fall a ramp experiences. Permitting the support legs to maintain a supporting position when the ramp is in free fall can minimize the effect of free fall, yet allowing the support legs to be retracted when the ramp needs to achieve a below dock position can reduce the occurrence of stump-out.

Referring now to FIG. 1 a side view of a loading dock 10 is shown. In front of the loading dock 10 is a driveway 12 extending to a dock face 14. The dock leveler 16 is located in a recess in the dock 10 called a pit 18. The pit 18 is positioned below the surface 20 of the loading dock 10. A dock leveler 16 includes a deck or ramp portion 22. The deck or ramp 22 is attached to a frame portion 24 of the dock leveler 16 by a hinge 26 and one or more pins 28. At the other end of the ramp 22, a lip 30 is attached to the ramp 22 by a hinge 32 and one or more hinge pins 34. It is the lip 30 that engages a vehicle 36 and completes a bridge between the loading dock 10 and the bed 38 of a vehicle 36. The bridge permits material and material handling equipment such as fork lifts to go between the bed 38 of the vehicle 36 and the loading dock 10. The dock leveler 16 also includes a support leg system 40 shown in FIG. 2.

Figure 2:
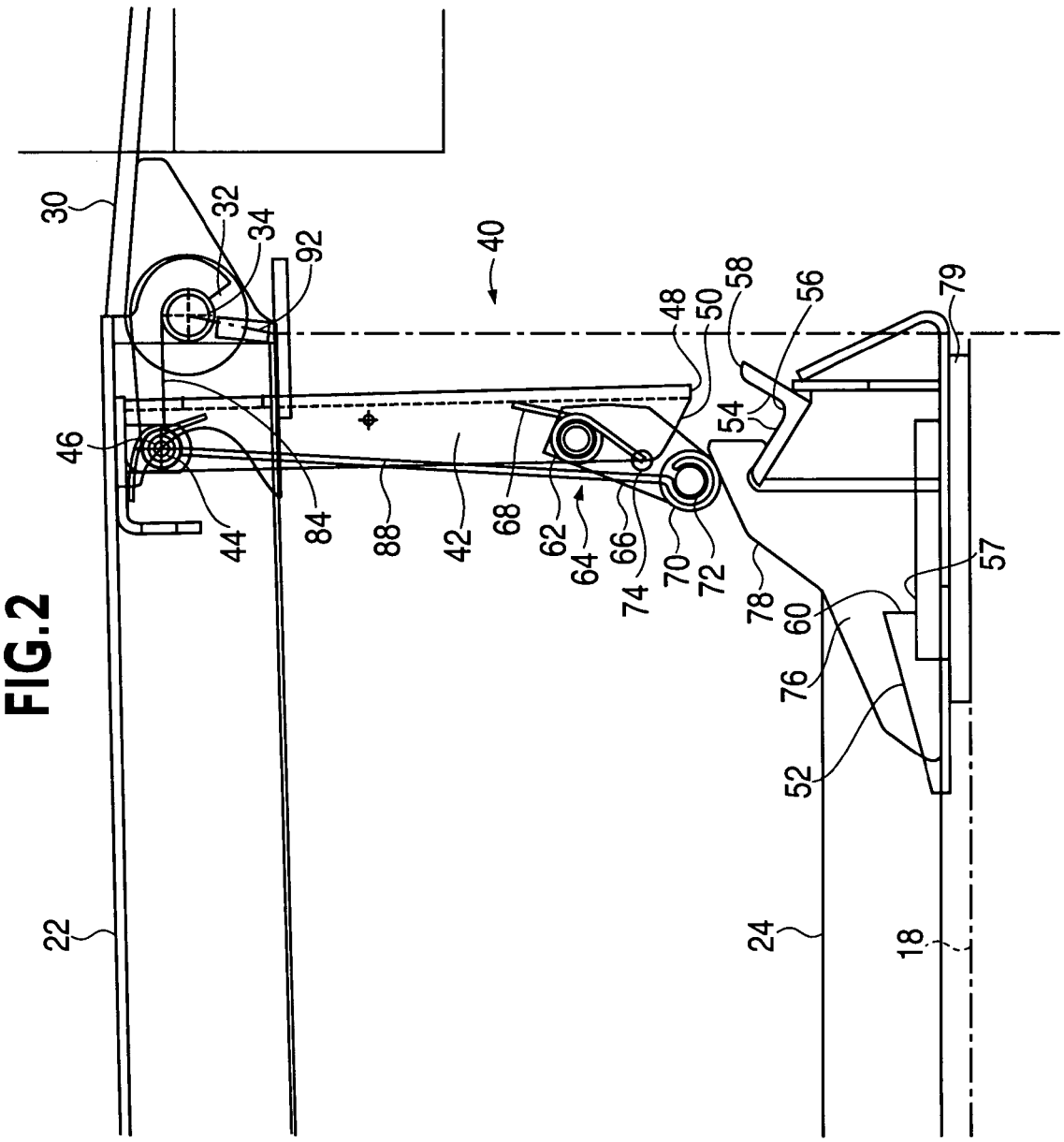
FIG. 2 is a side view of a support leg system for a dock leveler.
Figure 4:
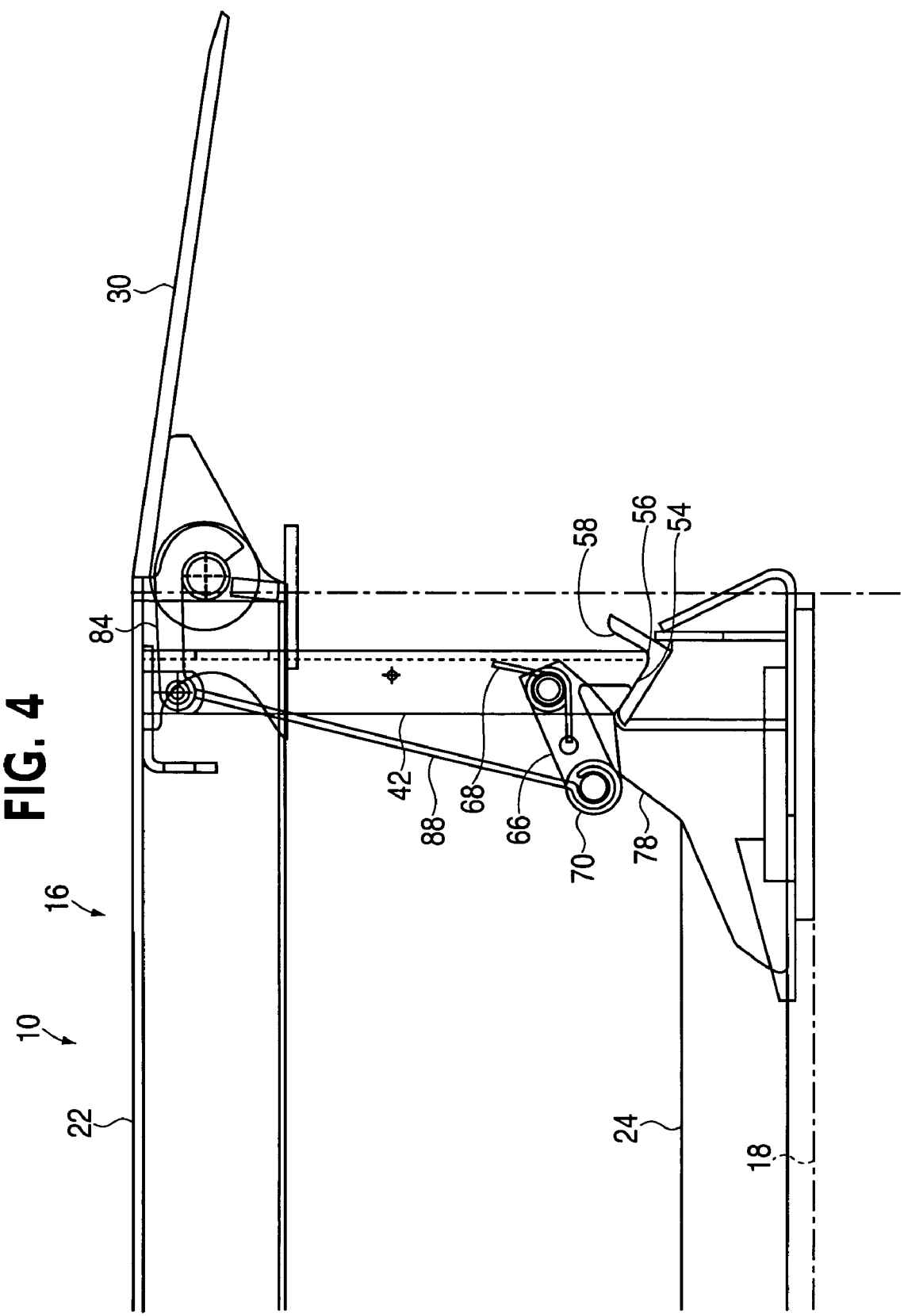
FIG. 4 is a side view of a dock leveler which has rapidly fallen and the support leg is supporting the ramp of the dock leveler.
Figure 6:
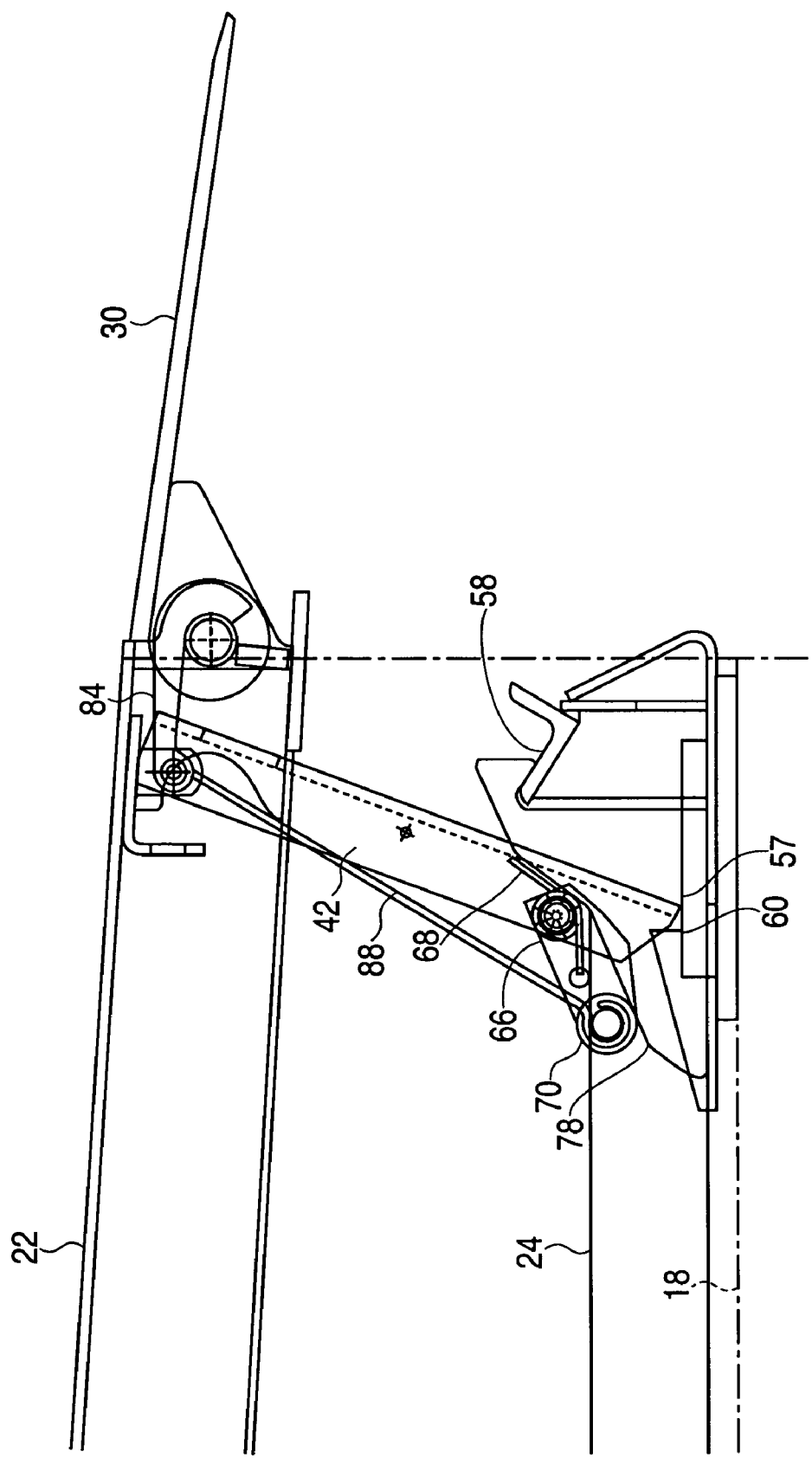
FIG. 6 is a side view of a dock leveler that has experienced a rapid fall after the support leg has started to retract and the support leg is in a secondary support position.

In the embodiment illustrated in FIG. 2 the support leg 42 is carried by a hinge assembly 44 attached underneath the deck 22. Some embodiments of the invention include two support legs 42 located parallel to each other at either side of the ramp. A spring 46 biases the leg 42 toward a support position. The support leg 42 has multiple support surfaces 48 and 50. The support surfaces interface with surfaces 52, 54, 56, 57 of support blocks 58 or 60. FIG. 4 shows the support leg 42 interfacing with the support surface 54 and 56 of support block 58. FIG. 6 shows the support leg 42 interfacing with the support surface 57 of support block 60.

Returning to FIG. 2, the support leg 42 has a pin 62 extending laterally that supports the cam roller assembly 64. The cam roller assembly 64 is comprised of a cam arm 66, a biasing spring 68 and a roller cam 70. The roller cam 70 is attached to the cam arm 66 by a shaft 72. The cam arm 66 includes a hole 74 that acts as a place for the spring 68 to attach to on the cam arm 66. Attached to the dock leveler frame 24 is a support block 58 which includes a saddle portion 54 and 56 configured to support and/or align the support leg 42. A secondary support block 60 is also provided to support or align the support leg 42 when the support leg 42 has been partially retracted and no longer able to engage the first stop block 58. A plate 76 defining a camming surface 78 is also attached to the frame portion 24 of the dock leveler 16. The frame portion 24 of the dock leveler 16 is supported by a shim 79 that extends to provide support to the frame portion 24 supporting stop blocks 58 and 60.

The function of the cam roller assembly 64 is to move the support leg 42 to the retracted position when the ramp 22 is descending at a relatively slow speed; i.e. when the dock leveler 16 is not in a free fall condition.

As the ramp 22 descends, the roller cam 70 engages the camming surface 78. As the ramp 22 continues to descend, the roller cam 70 continues to move along the camming surface 78. If the ramp 22 is moving downward at a relatively slow speed, then the spring 68 is able to urge the support leg 42 to rotate in a clockwise direction, or in other words, to a retracted position. However, if the ramp 22 is moving quickly in a downward direction, for example, in a free fall condition, then the roller cam 70 will move quickly down the cam surface 78. The spring 68 will not be able to quickly overcome the inertia associated with the support leg 42 and rotate the support leg 42 to the retracted position. Instead, the spring 68 will deflect, thus leaving the support leg 42 in a supporting position. Therefore, when the ramp 22 descends at a relatively slow rate of speed, the support leg 42 will retract. However, if the ramp 22 descends at a high rate of speed such as a free fall condition, the support leg 42 will remain in a supporting position.

The predetermined speed at which the support leg 42 will retract or stay in the support position will depend on the spring 68 and the weight and/or inertia associated with the support leg 42 and other variables associated with a particular installation. One skilled in the art will be able to make appropriate design choices to achieve the desired results of the invention. The spring 68 and support leg 42 and other factors specific to the installation should be considered and selected so that the support leg 42 stays in a support position when the ramp 22 is in free fall.

Figure 3:
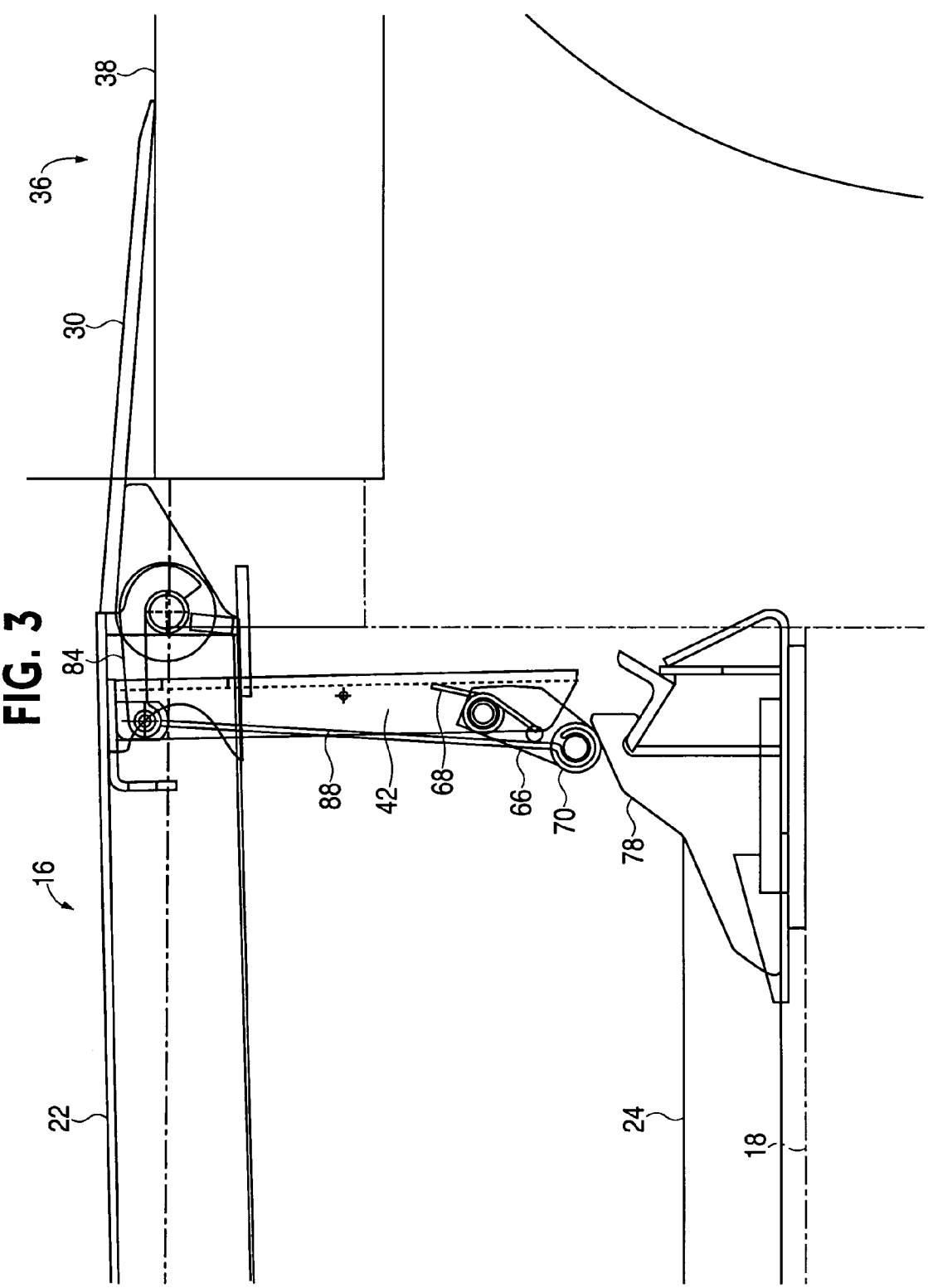
FIG. 3 is a side view of a dock leveler with a lip engaged with a vehicle bed and a roller cam engaging a camming surface.

FIG. 3 illustrates the dock leveler 16 engaging a vehicle 36.

FIG. 4 illustrates the support leg 42 in the support position when the ramp 22 has descended quickly. The spring 68 is deflected as the roller cam 70 is quickly moved on the camming surface 78 because the spring 68 is not able to quickly overcome the inertia of the support leg 42 and rotate it to a retracted position.

According to some embodiments of the present invention, the support leg 42 may be used to support the ramp 22 at the dock level position (i.e., when the ramp 22 is level with the surrounding loading dock 10). For example, in FIG. 4 the support leg 42 is engaging the first stop block 58 and the ramp 22 is at the dock level position. Storing the dock leveler 16 with a ramp 22 in the dock level position is a preferred mode of storage because it eliminates any tripping hazard created by a ramp 22 above or below dock level.

Figure 5:
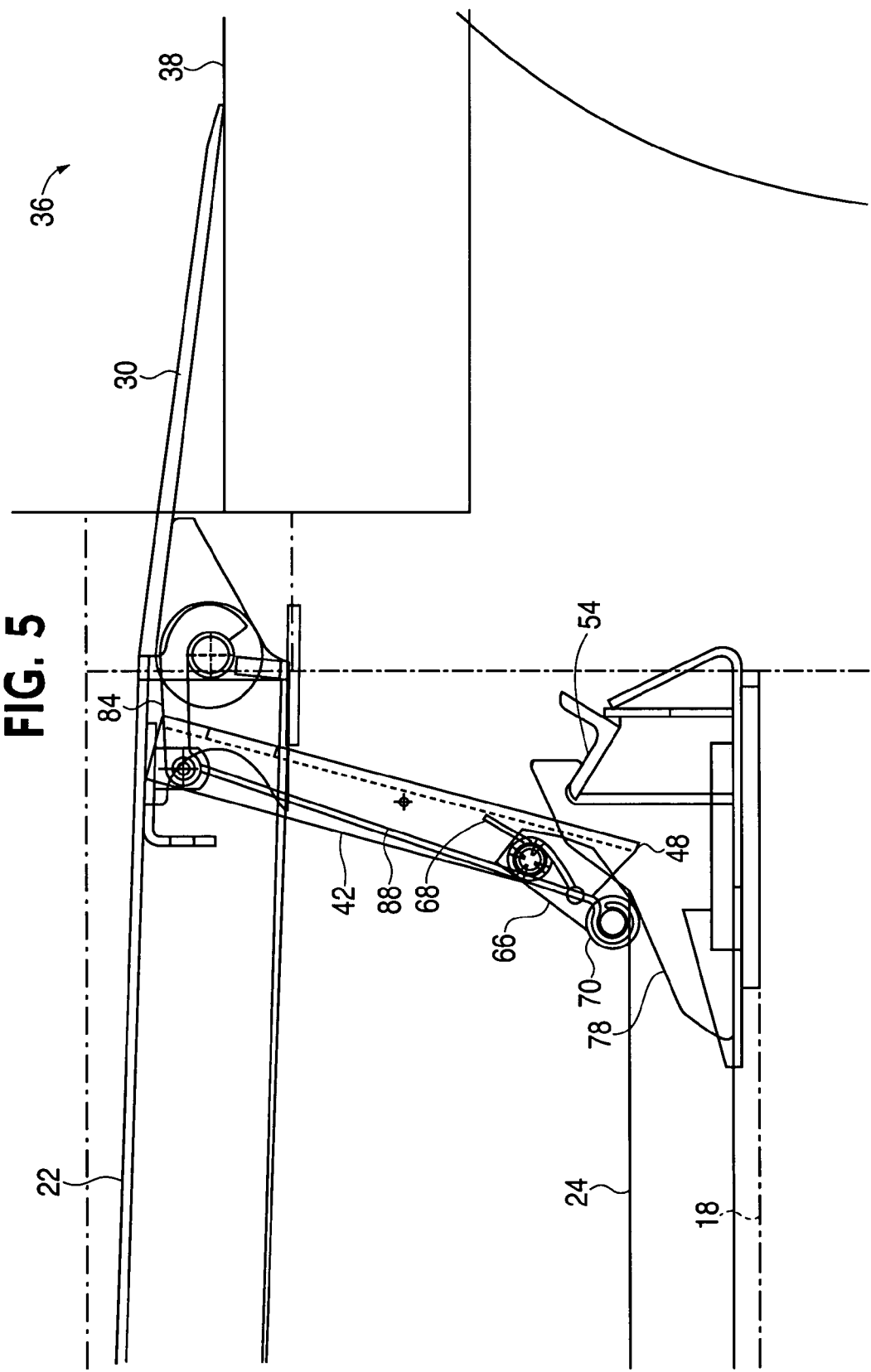
FIG. 5 is a side view of a dock leveler with the lip of the dock leveler engaged with a low vehicle bed and the support leg is in a partially retracted position.

FIG. 5 illustrates a condition where the ramp 22 starts to descend slowly and the roller cam 70 moves down the camming surface 78 and the spring 68 urges the support leg 42 to retract. Further as shown, the support surface 48 has moved to a position where it can not be supported by the support surface 54 if there is further decent of the ramp 22.

If after the support leg 42 starts to retract due to a slow downward movement of the ramp 22, and if the ramp 22 suddenly descends rapidly, then the spring 68 will be deflected as the roller cam 70 is quickly moved on the camming surface 78. This is because the spring 68 is not able to quickly overcome the inertia of the support leg 42 and rotate it to a retracted position and thus, the support leg 42 engages in an intermediate support position as the spring 68 deflects. The intermediate support position is shown in FIG. 6. In FIG. 6 the support leg 42 has been retracted enough to not contact the first stop block 58 but instead contacts the second stop block 60.

Figure 7A:
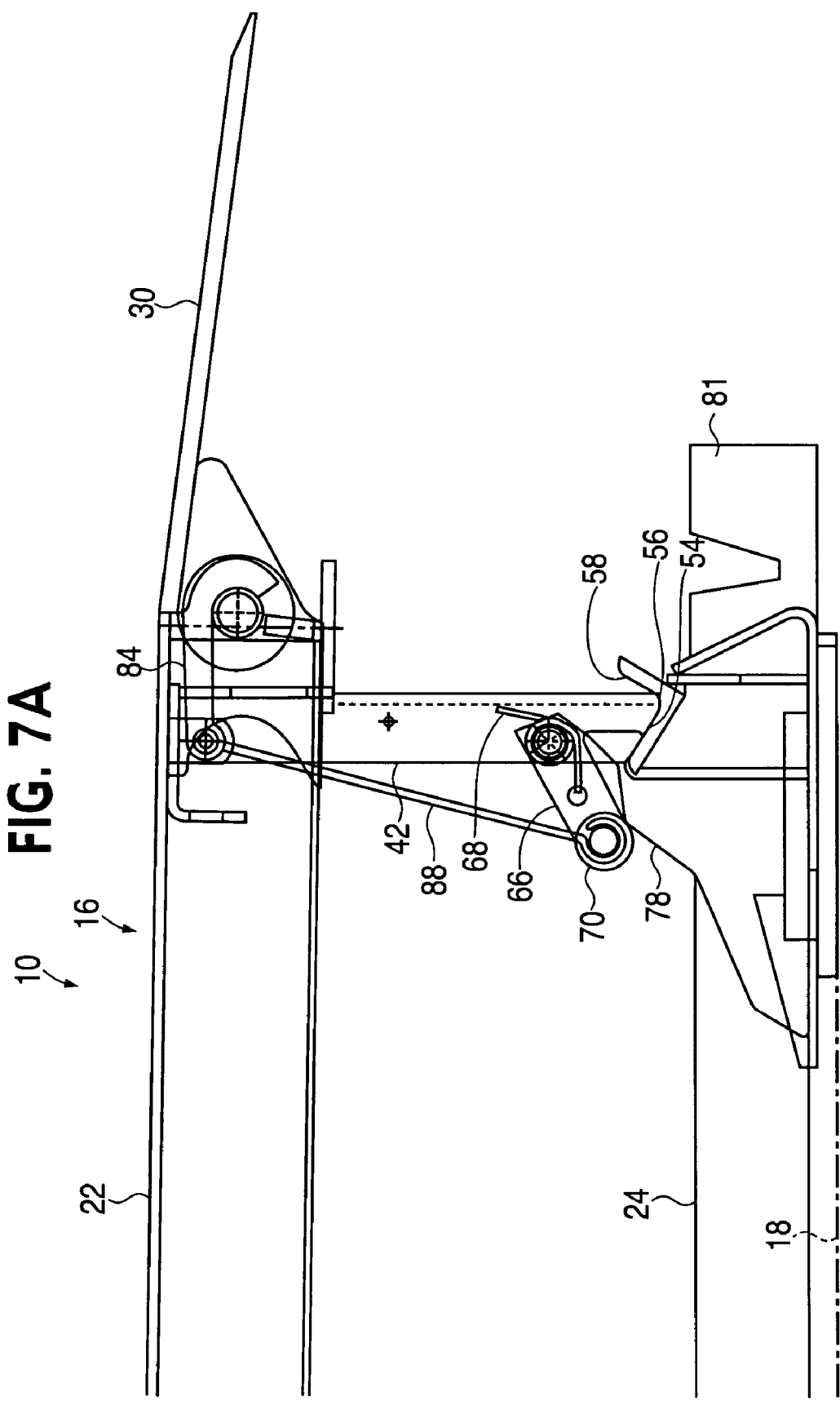
FIG. 7A is a side view of a dock leveler where the ramp is supported by the support leg in a below dock level position.

In other embodiments of the present invention as shown in FIG. 7, the ramp 22 is supported in the level position by the lip 30 engaging a lip keeper 81. The lip keeper 81 may be attached to the frame 24 of the dock leveler 16 or to some other portion of the dock 10 or dock leveler 16 near the dock face 14. When the lip keeper 81 supports the ramp 22 in the level position, the support leg 42 may be dimensioned so that the support leg 42 does not contact the stop block 58 when the ramp 22 is in a level position. The support leg 42 may be dimensioned to support the ramp 22 when the ramp 22 is in a below dock level condition as shown in FIG. 7A.

Other embodiments of the present invention may include the support leg 42 attached to some other structure other than the ramp 22. For example, in FIG. 8 the support leg 42 is attached to a structure 80 which in turn is attached to the pit 18. The structure 80 may be attached to the pit 18 via a shim 79.

Figure 9:
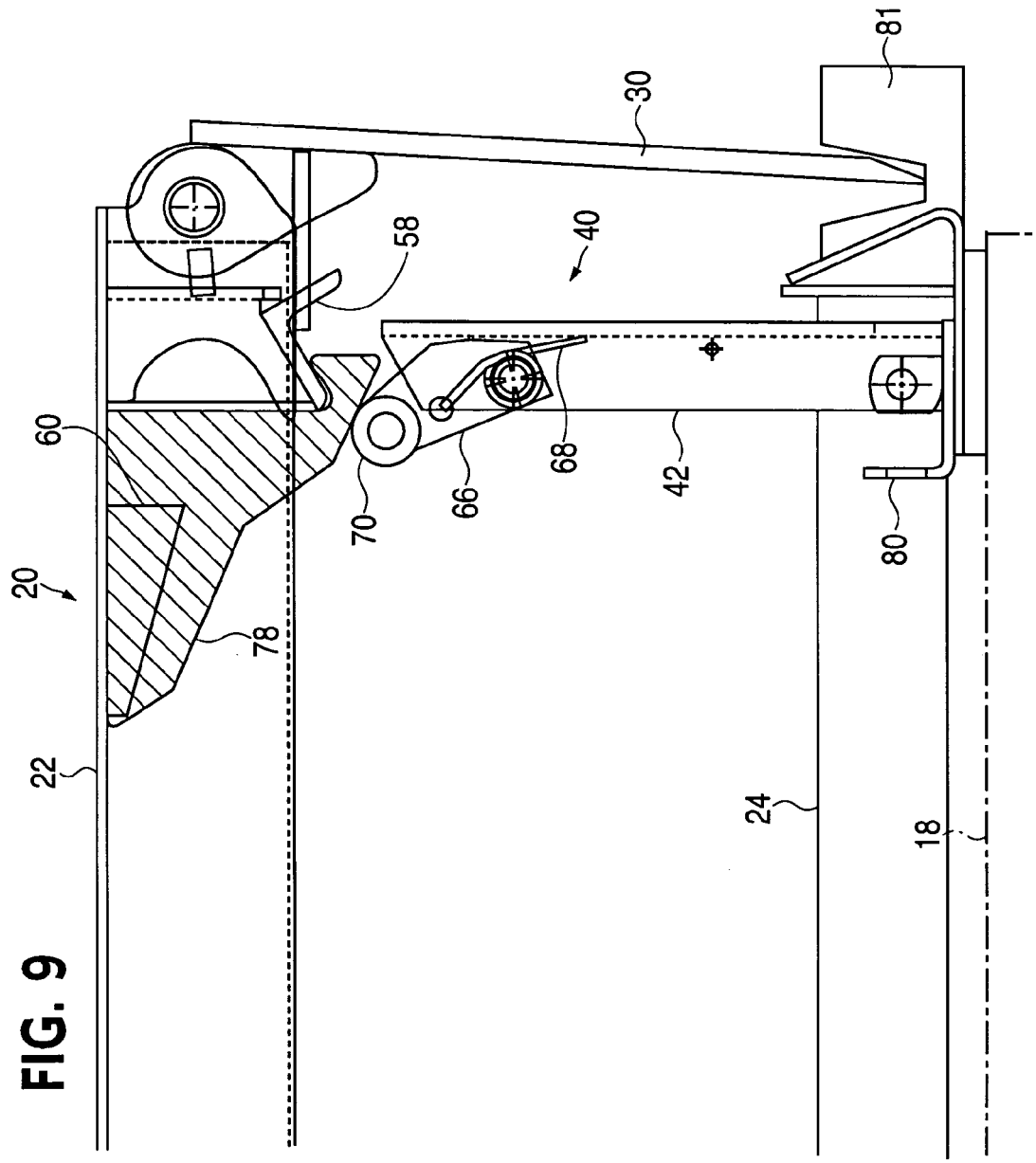
FIG. 9 is an embodiment of the present invention where the support leg is mounted in a pit portion of the dock and the ramp is supported by a lip engaging the lip keeper.

As shown in FIG. 9, other embodiments of the present invention may include attaching the support leg 42 to a frame portion 24 of the dock leveler 16. The stop 58 is attached to the under portion of the ramp 22. The camming surface 78 may also be attached to the underside of the ramp 22. The support leg 42 may be dimensioned to not contact the stop 58 when the ramp 22 is in a dock level position but rather a lip keeper 81 and the lip 30 may support the ramp 22 at the dock level position.

Figure 10:
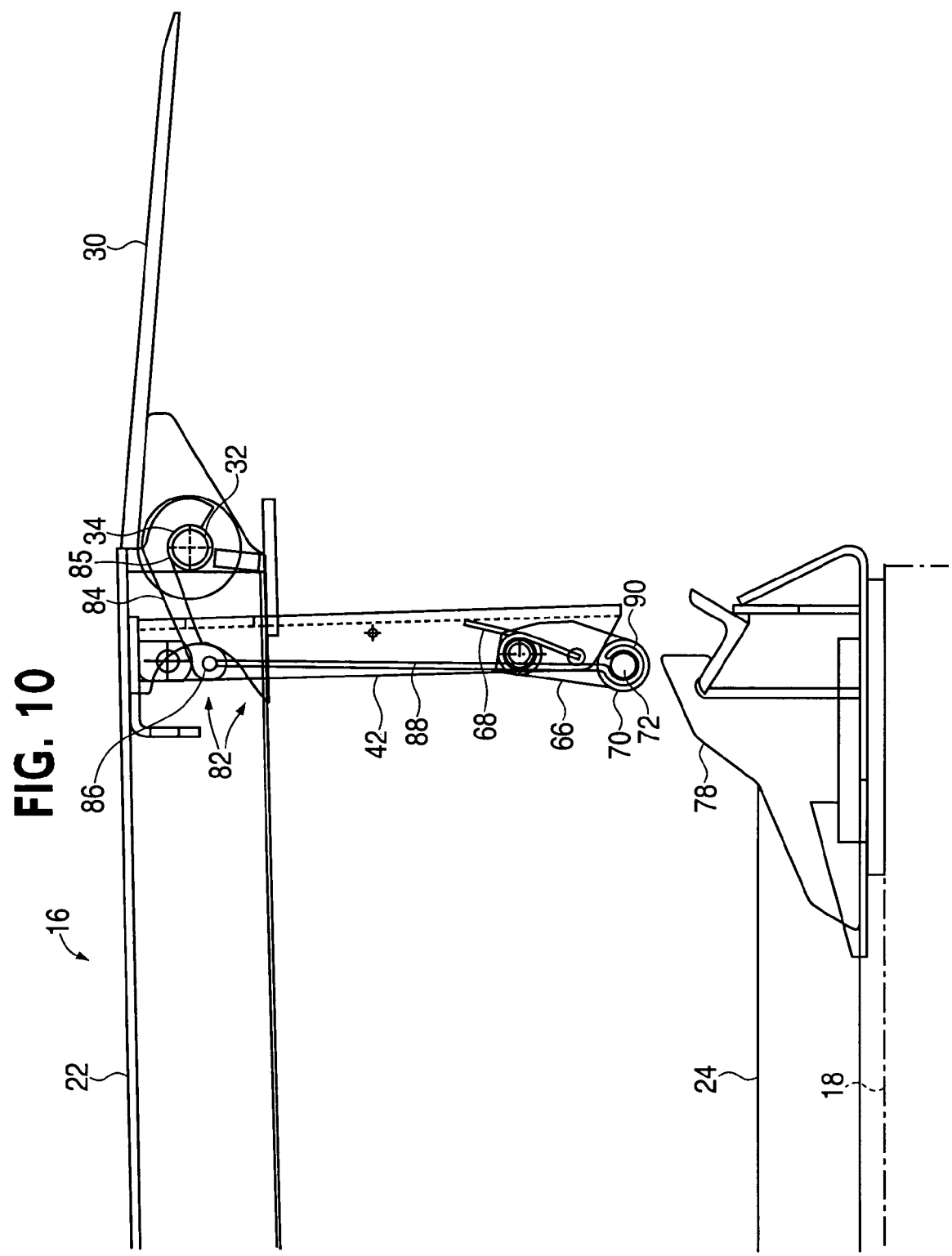
FIG. 10 is a side view of a dock leveler where the ramp is in a slightly inclined position such that the roller cam does not engage the camming surface.

The support leg system 40 as shown in FIG. 10 provides for the support leg 42 to be in a support position when the ramp 22 descends rapidly, and the support leg 42 to be retracted when the ramp 22 descends slowly. There may be an occasion when it is desired to permit the support leg 42 to remain in the support position when the ramp 22 descends slowly. For example, when a dock leveler 16 no longer needs to be used, it is stored with the ramp 22 in the level position. In some embodiments the support leg 42, rather than a lip keeper 81 is used to support the ramp 22 in the level position. In such case, it may be desired to slowly move the ramp 22 from a raised position when engaging a vehicle 36 to a stowed or level position. Thus, a disengaging system 82 is provided to disengage the roller cam 70 from the camming surface 78, preventing the support leg 42 from retracting as the ramp 22 descends slowly.

As shown in FIG. 10 a disengaging mechanism 82 may be provided on the dock leveler 16 to disengage the support leg 42 retracting apparatus. The disengaging mechanism 82 shown in FIG. 10 includes an arm 84 connected to the lip hinge 32. The arm 84 is configured to pivot around the lip hinge pin 34. The lip hinge pin 34 may be encased in a tube 85, and the arm 84 and the tube 85 pivot around the hinge pin 34. At the end of the arm 84 is a hole 86 which provides for a rod 88 to attach to the arm 84. The rod 88 also has a loop shaped end 90 which attaches around the shaft 72 of the roller cam 70. When the arm 84 pivots, it acts on the rod 88 which in turn acts on the shaft 72 to flex the spring 68 and move the roller cam 70 away from the camming surface 78.

Figure 11:
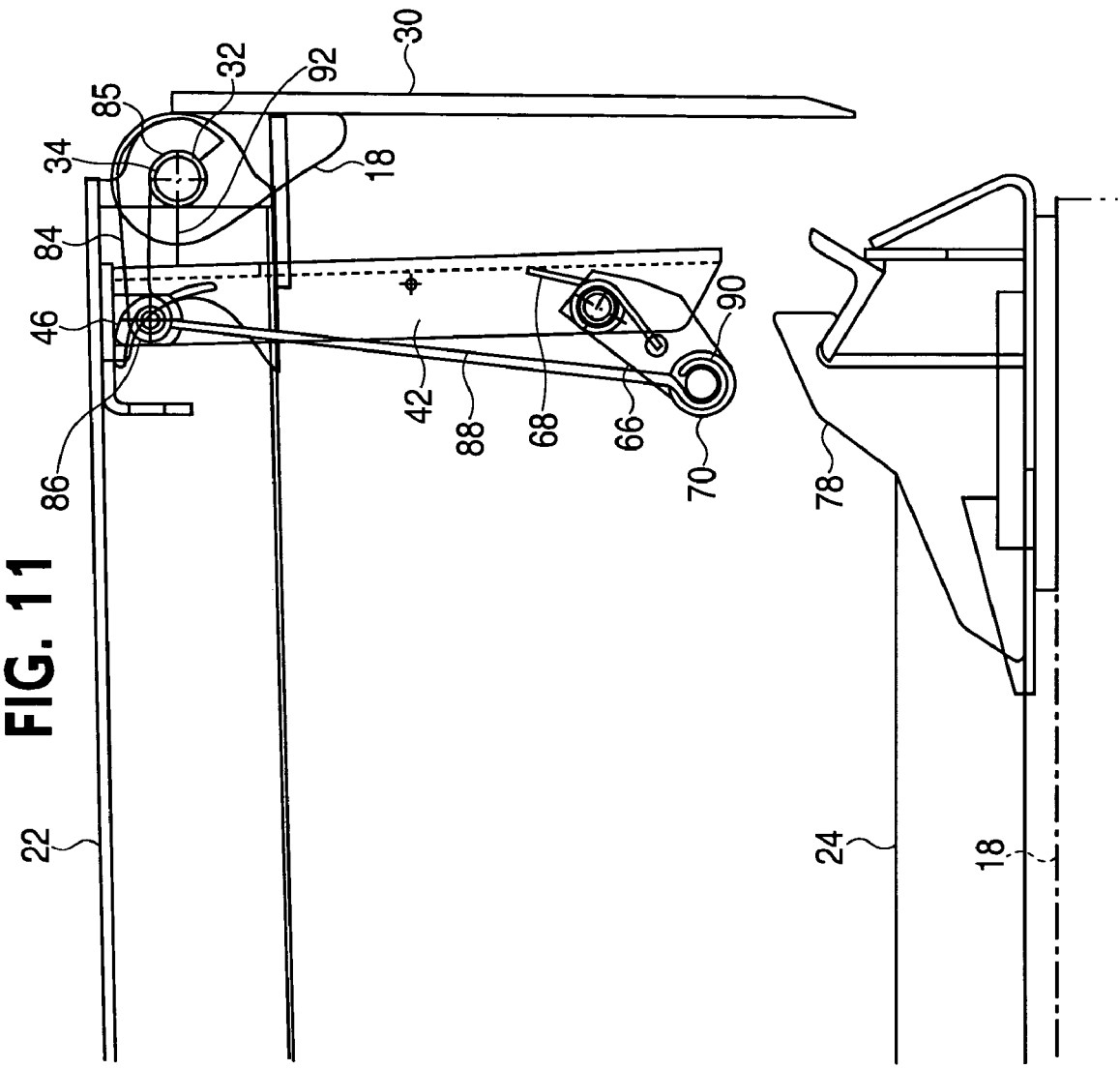
FIG. 11 is a side view of a dock leveler where the lip is in a pendant position preventing the roller cam from engaging the camming surface.

FIG. 11 shows the arm 84 pivoted and causing the roller cam 70 to be disengaged from the camming surface 78. A striker 92 located on the hinge 32 of the lip 30 contacts the arm 84 and causes the arm 84 to pivot when the lip 30 rotates to a pendant position as shown in FIG. 11. The striker 92 rotates clockwise and engages the arm 84 which in turn acts on the rod 88 pulling the roller cam 70 away from the camming surface 78, thus permitting the support leg 42 to maintain the support position and support the dock leveler ramp 22 when the lip 30 is in a pendant position.

Figure 8:
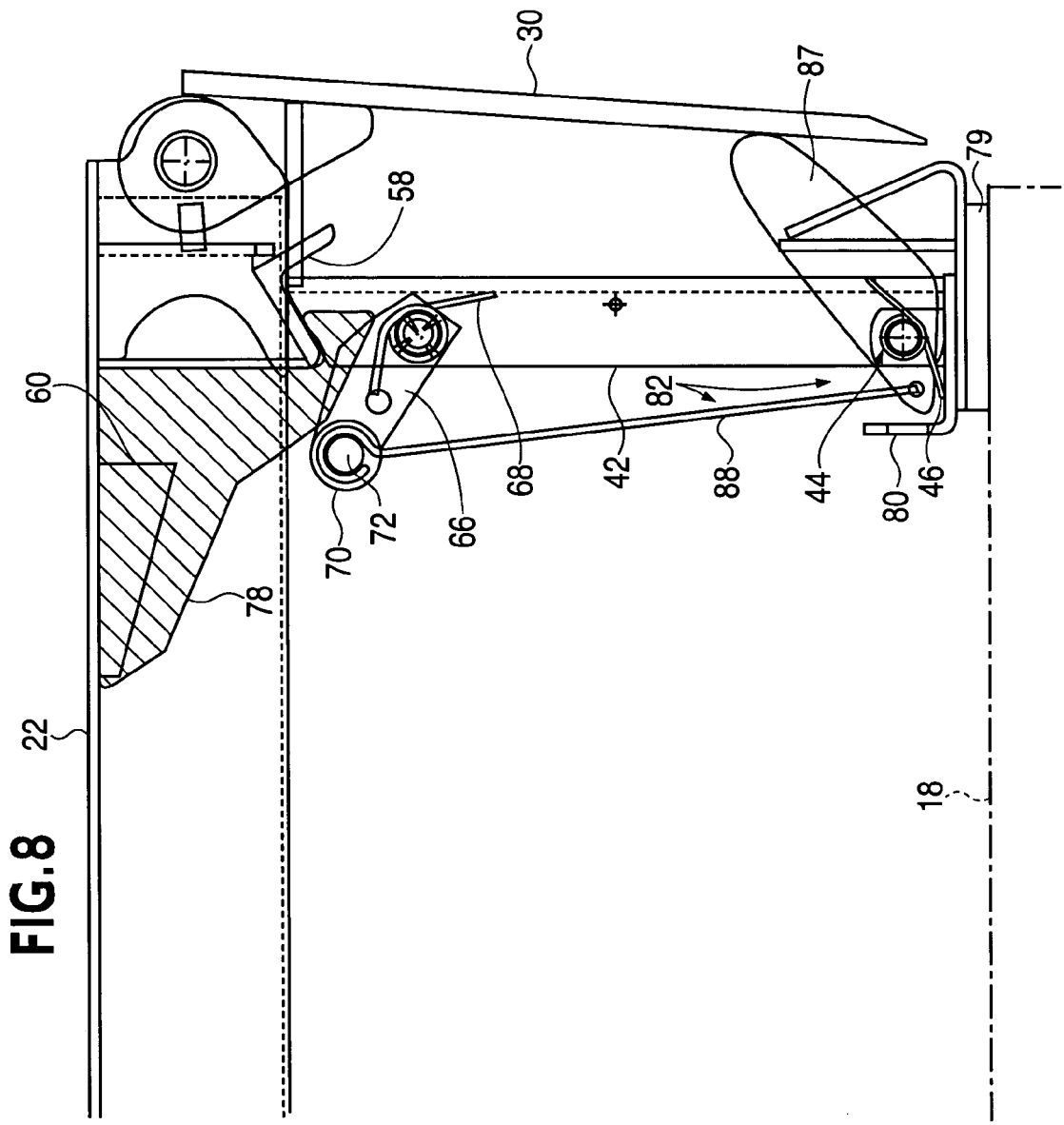
FIG. 8 is an embodiment of the invention where the support leg is mounted in the pit portion of the dock rather than to the ramp.

An alternate embodiment of the disengaging mechanism 82 is shown in FIG. 8. The disengaging mechanism 82 shown in FIG. 8 causes the support leg 42 to remain in the support position when the lip 30 is in a pendant position. The disengaging mechanism shown in FIG. 8 includes an arm 87 and a rod 88 attached around the shaft 72 of the roller cam 70. The disengaging mechanism 82 operates in a similar manner as described above, except that rather than a striker engaging the arm 84 to pivot the cam arm 66, the lip 30 directly contacts the arm 87 to pivot the cam arm 66 when the lip 30 is in a pendant position.

In the embodiments shown in FIGS. 8 and 11, the springs 46 and 68 are selected, and the arms 84 and 87 the rod 88 and the shaft 72 of the roller cam 70 are positioned, so that when the lip 30 is in a pendant position, the rod 88 pulls on the shaft 72 of the roller cam 70 and exerts a moment about the pivot point of the cam arm 66 strong enough to flex spring 68. A moment may also be exerted about the pivot point of the support leg 42 but it is not sufficient to flex spring 46. Thus, the spring 68 will deflect rather than spring 46, which will result in the support leg 42 not retracting.

Although embodiments shown in the figures described herein use a roller cam 70 and camming surface 78 to retract the support leg 42 when the ramp 22 is descending in a slow manner, it would be appreciated by one skilled in the art that other items can be used.

An embodiment in accordance with the present invention provides a support leg system configured to support a dock leveler in a free fall condition and to retract the support leg system to avoid a stump-out condition.

Figure 12:
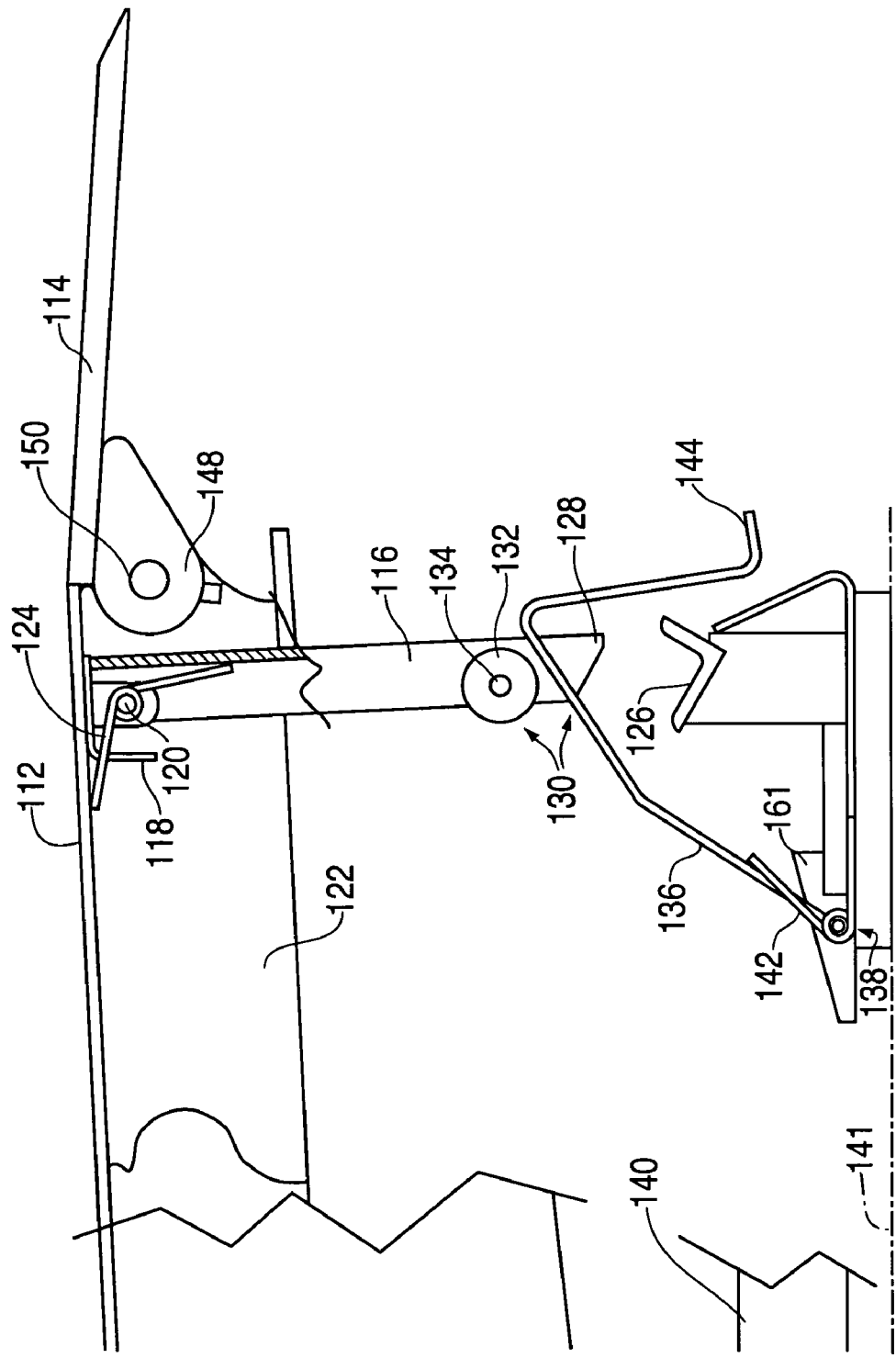
FIG. 12 is a side view illustrating a support leg system according to a preferred embodiment of the invention.

Another embodiment of the present inventive apparatus is illustrated FIG. 12. FIG. 12 shows a dock leveler 110 having a ramp 112 and a lip 114 attached to the ramp 112 by a hinge 148 and hinge pin 150. The ramp 112 also carries a support leg 116. The support leg 116 is attached to the ramp 112 by a bracket 118. The support leg 116 is pivotally attached to the bracket 118 by a pin 120. Under the ramp 112 are beams 122. Alternately, the support leg 116 can be attached to a beam 122. Support leg 116 is biased to a forward position, also known as a supporting position, by a torsion spring 124. The supporting position is the position illustrated in FIG. 12. When the support leg 116 is in the support position and the ramp 112 descends at or greater than a predetermined rate, the end 128 of the support leg 116 engages the support structure 126.

A secondary support structure 161 is also provided. The secondary support structure 161 will be engaged by the support leg 116 when the ramp 112 starts to descend slowly causing the support leg 116 to partially retract. If the ramp 112 starts to descend faster than the predetermined rate, and the camming surface 136 is deflected when the support leg 116 is partially retracted, the support leg 116 may engage the secondary support 161. The interaction of the support leg end 128 and the support structure 126 or secondary support 161 causes the ramp 112 to be supported.

There may be times when it is desired to have the ramp 112 descend to a lower position than the position the ramp achieves when the ramp 112 is supported by the support leg 116. In order to permit the ramp 112 to achieve a lower position and when supported by the support leg 116, a support leg retracting apparatus 130 is provided.

According to one embodiment of the present invention, the retracting apparatus 130 includes a roller cam 132 mounted on the support leg 116 by an axle 134. A camming surface 136 is provided for the roller cam 132 to interact with. The roller cam 132 and the camming surface 136 are configured to permit the roller cam 132 to slide or roll along the camming surface 136. The roller cam 132 is attached to the support leg 116 so that as the roller cam 132 moves along the camming surface 136, the support leg 116 is retracted. While the illustrated embodiments show roller cams, other types of cams may be used.

The camming surface 136 is mounted to a camming surface support structure 138. The camming surface support structure 138 is mounted to the dock leveler frame 140. In other embodiments of the invention, the camming support structure 138 may be mounted to the pit floor 141. The camming surface 136 is biased to an upward position (the position shown in FIG. 12) by a torsion spring 142. Other embodiments of the present invention may include using other types of springs or other means for biasing the camming surface 136. Attached to the camming surface 136 is a lip holder 144.

Figure 13:
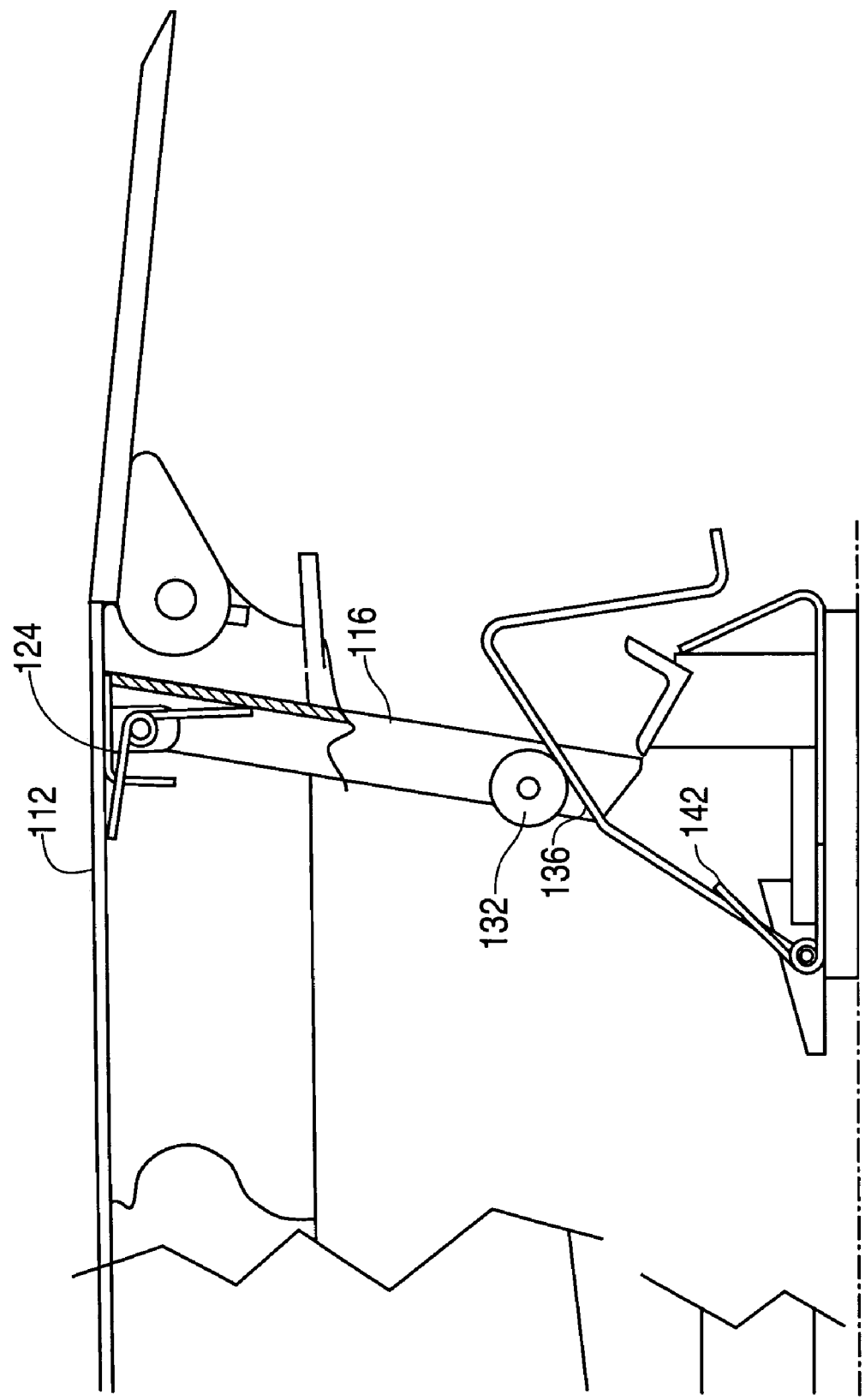
FIG. 13 is a side view of the support leg system of FIG. 12 where the roller cam has engaged the camming surface and has started to retract the support leg.
Figure 14:
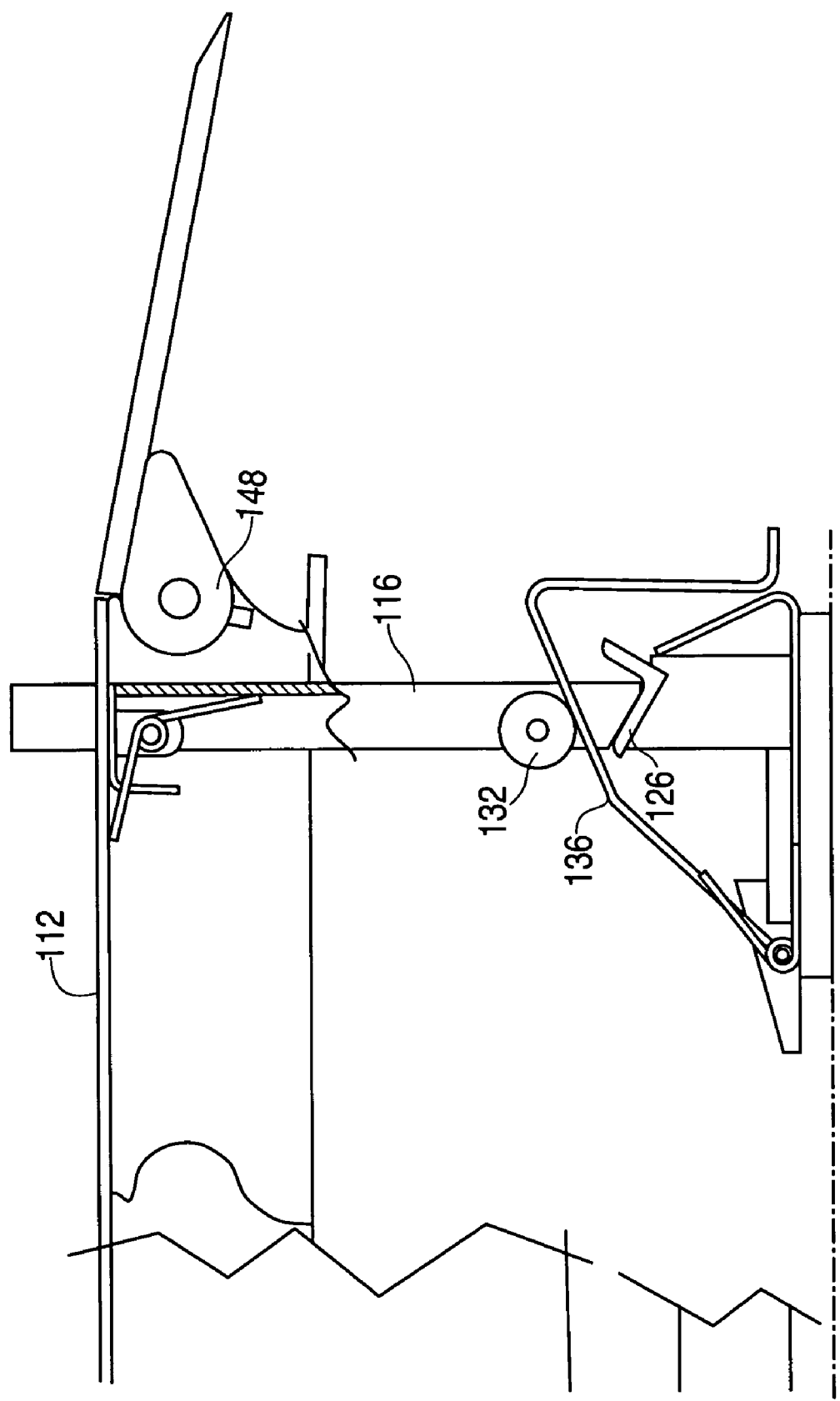
FIG. 14 is a side view of the support leg system of FIG. 12 where the roller cam has engaged the camming surface at a relatively high speed and deflected the camming surface rather than retracted the leg, and the leg is supporting the ramp.

In FIG. 13 the ramp 112 has descended slowly. Slow descent of the ramp 112 causes the roller cam 132 to engage the camming surface 136 and start to roll down the camming surface 136. The rolling action of the roller cam 132 causes the support leg 116 to move to the retracted position. In contrast, if the ramp 112 had descended quickly, as shown in FIG. 14 the roller cam 132 would have struck the camming surface 136 at a high rate of speed causing the torsion spring 142 to flex and move the camming surface 136 to a downward position. Moving the camming surface 136 to a downward position would cause the support leg 116 to maintain the supporting position rather than retract.

The support leg system of the dock leveler 110 can be calibrated to cause the camming surface 136 to move to a downward position or to maintain its biased position according to a predetermined rate of speed that the ramp descends. The predetermined rate of speed that will cause the support leg 116 to maintain the support position rather than retract can be selected and the system calibrated accordingly. For example, it is likely that when the ramp 112 is in a freefall condition, it is desired that the support leg 116 maintain a supporting position and that the camming surface 136 move to the lowered position rather than allowing the roller cam 132 to roll down the camming surface 136. These design choices are made according to individual applications and needs of each situation. One skilled in the art will know what springs 124 and 142 should be selected in order to achieve support leg 116 retraction at a particular speed or deflection of the camming surface 136 at a particular speed. Of course, these design choices will preferably incorporate factors such as the inertia and weight of the camming surface 136, the support leg 116, the camming roller 132 and the force of the springs 124 and 142.

FIG. 14 shows the ramp 112 being supported by the support leg 116. The support leg 116 is set in and supported by a saddle shaped support structure 126. The roller cam 132 is engaged with the camming surface 136. In order for the support let 116 to be in the support position rather than a retracted position, the roller cam 132 engaged the camming surface 136 at a speed great enough to move the camming surface 136.

Figure 15:
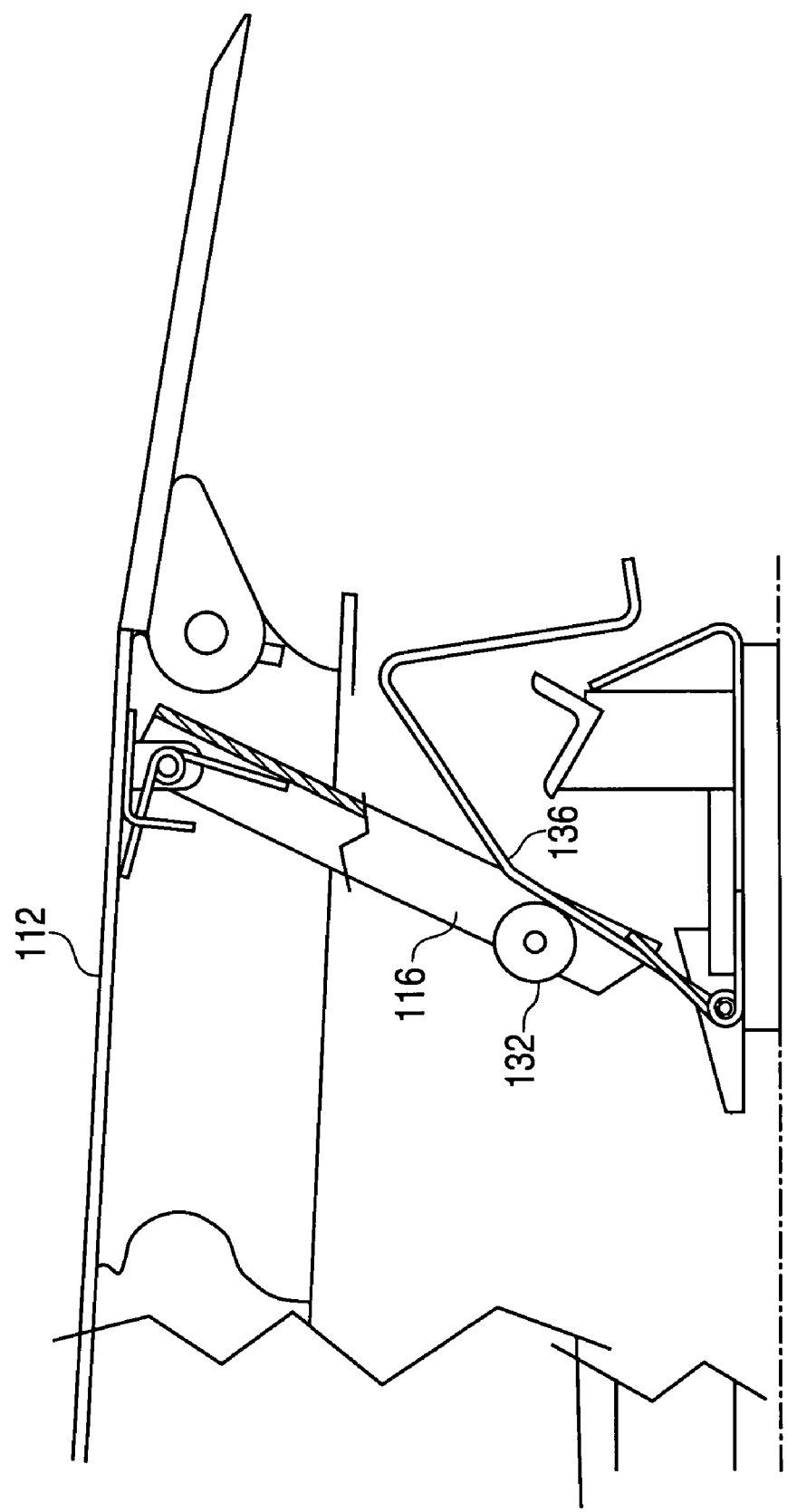
FIG. 15 is a side view of the support leg system of FIG. 12 where the support leg has engaged the camming surface at a relatively slow speed and the support leg is retracting as the ramp descends.

FIG. 15 shows the ramp 112 descending at a relatively slow speed where the support leg 116 moves to a retracted position and the roller cam 132 moves down the camming surface 136.

Figure 16:
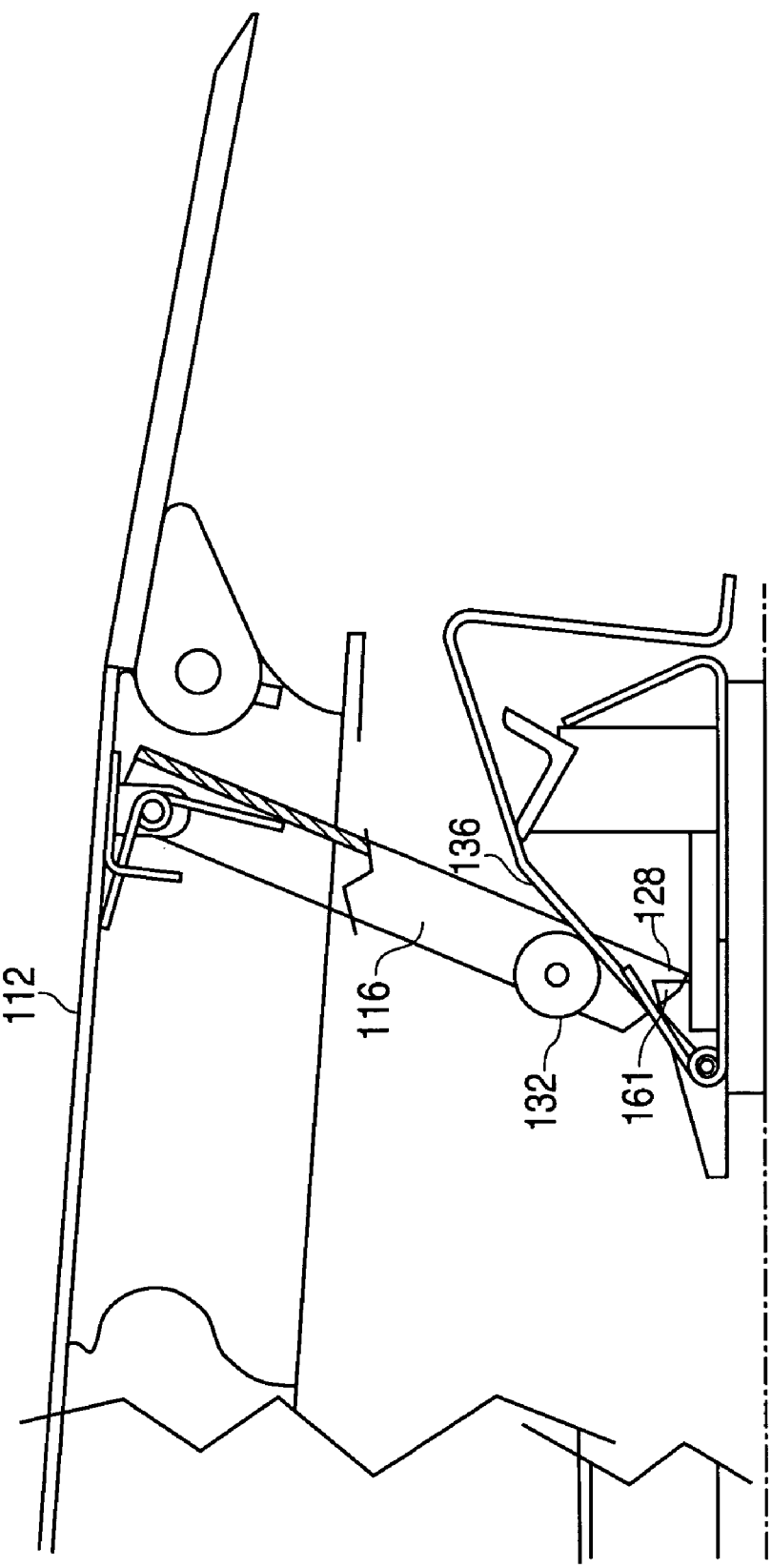
FIG. 16 is a side view of the support leg system of FIG. 12 where the support leg is supporting the ramp in a secondary support position.

FIG. 16 shows the ramp 112 supported by the support leg 116. The support leg 116 is in a secondary support position. The end 128 of the support leg 116 is butted against the secondary support 161. The secondary support 161 provides a support position for the support leg 116 in cases where the support leg 116 has partially retracted. Once the support leg 116 starts to retract and then the ramp 112 falls faster than the predetermined rate, camming surface 136 will move downward. If the support leg 116 has not retracted past the secondary stop position, then the support leg 116 will butt against the secondary stop 161 and support the ramp 112 as shown in FIG. 16. Other embodiments of the invention, may include additional secondary supports or no secondary supports.

Figure 17:
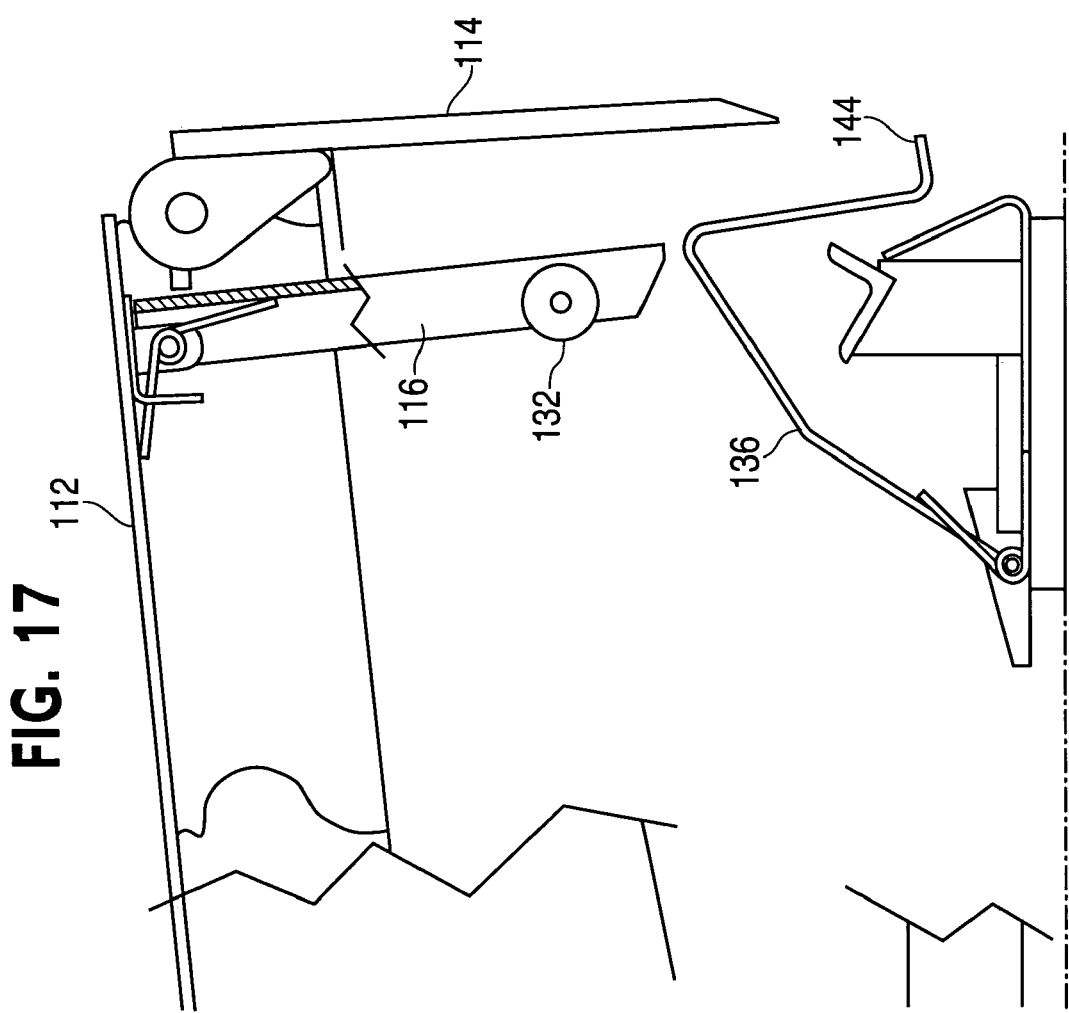
FIG. 17 is a side view of the support leg system of FIG. 12 where the support leg and roller cam are not in contact with the camming surface and the lip is in a pendent position.

FIG. 17 shows the ramp 112 in a raised position where the lip 114 is in a pendent position. The support leg 116 is in a supporting position and the camming surface 136 is in the raised position. As the ramp 112 starts to descend (whether fast or slow) the lip 114 will engage the lip holder portion 144 of the camming surface 136.

Figure 18:
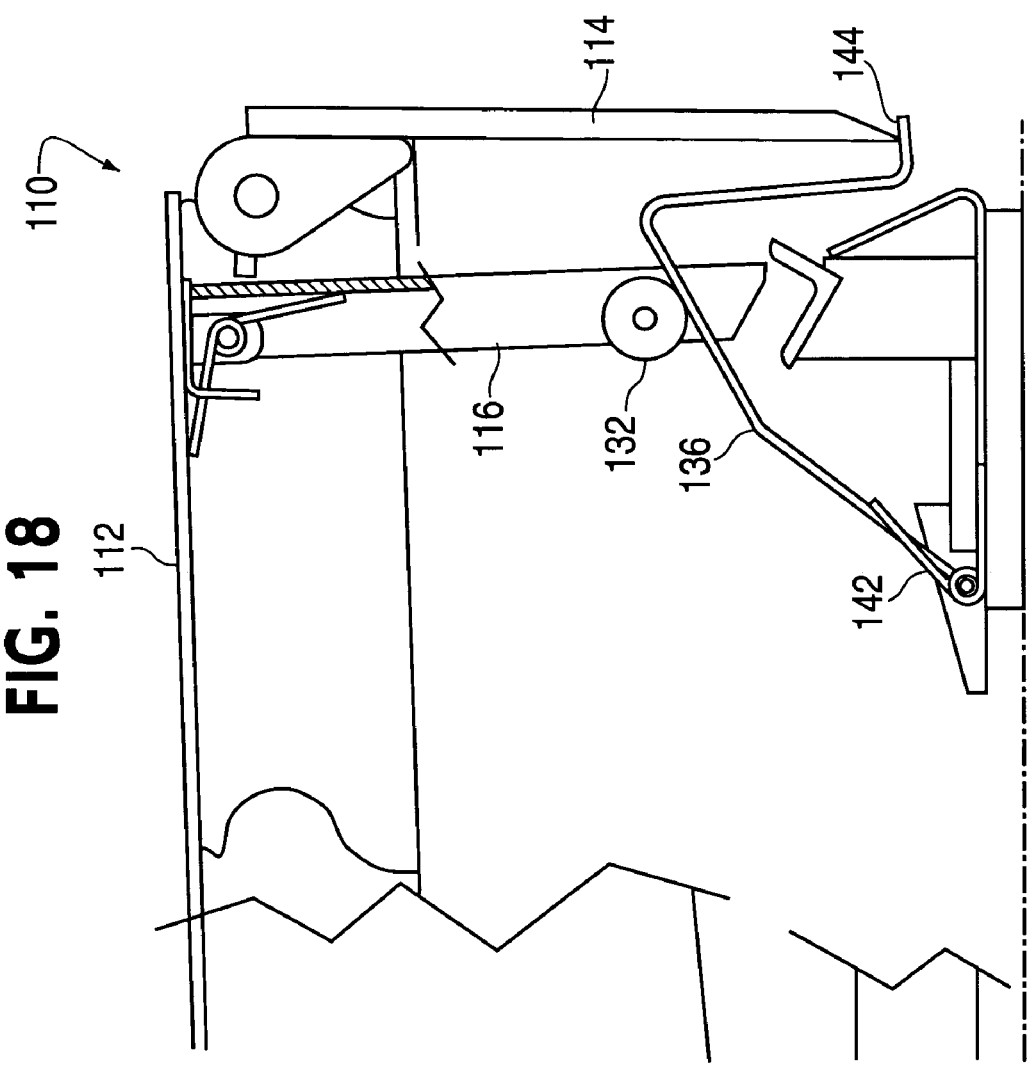
FIG. 18 is a side view of the support leg system of FIG. 12 where the lip is in contact with a lip holder attached to the camming surface.

In FIG. 18 the lip 114 has engaged the lip holder 144. As the ramp 112 continues to move down, the lip 114 flexes the spring 142 to move the camming surface 136 to the lowered position by urging the lip holder portion 144 down. Because the camming surface 136 is moved to a downward position, the roller cam 132 does not move down the camming surface 136, thus the support leg 116 is maintained in the support position as shown in FIG. 18.

In some embodiments of the present invention, as shown in FIG. 18, when the lip 114 is engaged with the lip holder 144 the roller cam 132 is engaged with the camming surface 136. In other embodiments the present invention, when the lip 114 is engaged with the holder 144 the roller cam 132 is not engaged with camming surface 136.

The lip support 144 feature on the camming surface 136 permits the leg 116 to not retract whenever the lip 114 is the pendant position. This feature may be useful when stowing or storing a dock leveler 110. For example, dock levelers 110 are often desired to be stowed or stored in the position where the support leg 116 is supporting the ramp 112. In addition, dock levelers 110 are often stowed or stored when the lip 114 is the pendant position. The lip holder 144 feature permits the dock leveler 110 to be moved relatively slowly to a stored or stowed position without causing support leg 116 to retract.

Figure 19:
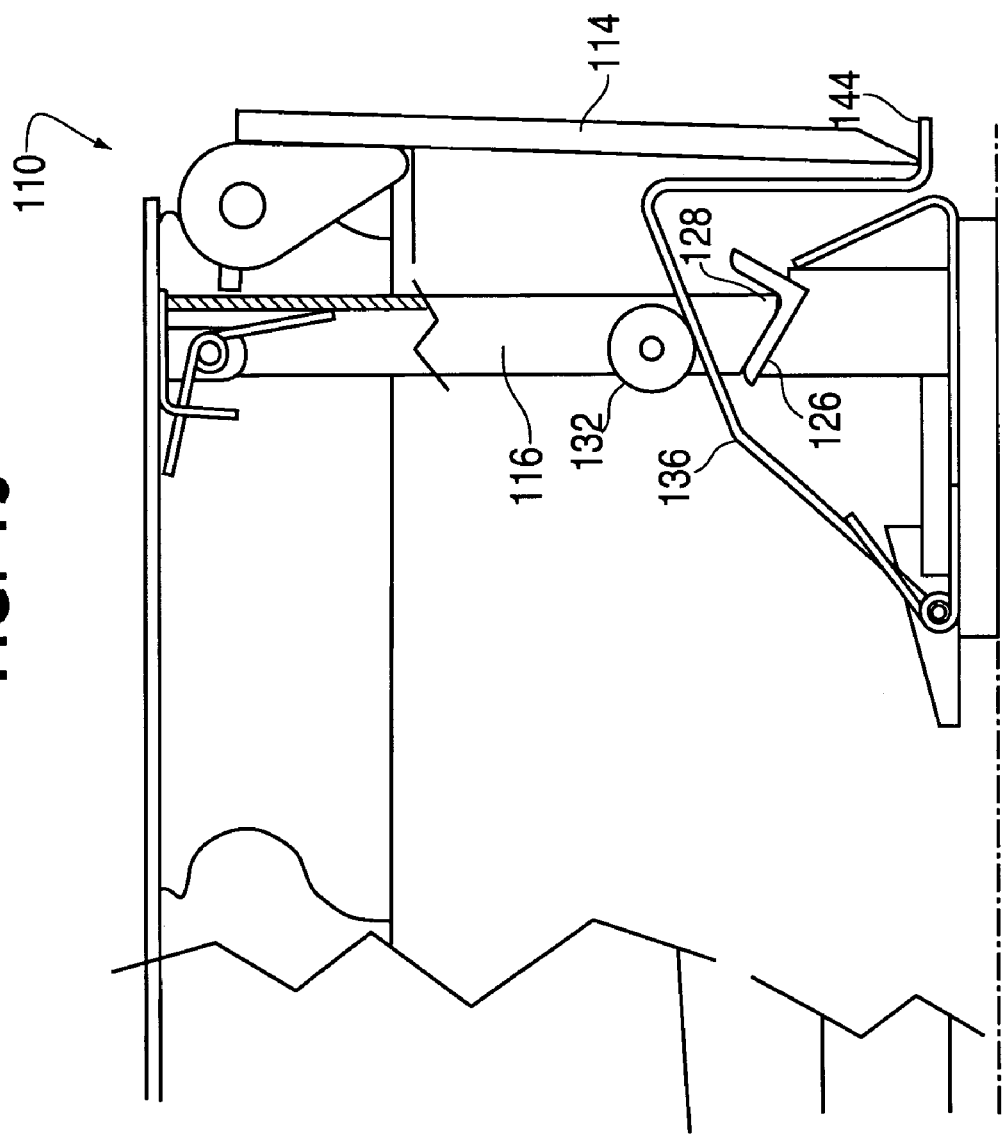
FIG. 19 is a side view of the support leg system of FIG. 12 where the lip is in contact with the lip holder portion of the camming surface and has deflected the camming surface and the support leg is engaged to the support structure.

FIG. 19 illustrates the dock leveler 110 in a stored or stowed position. The lip 114 is in a pendant position and engaged with the lip holding apparatus 144. The camming surface 136 has moved to the lowered position. The support leg 116 is in the supporting position and the end of support leg 128 is engaged with the supporting structure 126. The roller cam 132 is engaged with the camming surface 136. In other embodiments of the present invention, the roller cam 132 may not be engaged with camming surface 136 when the dock leveler 110 is in the stored position.

Figure 20:
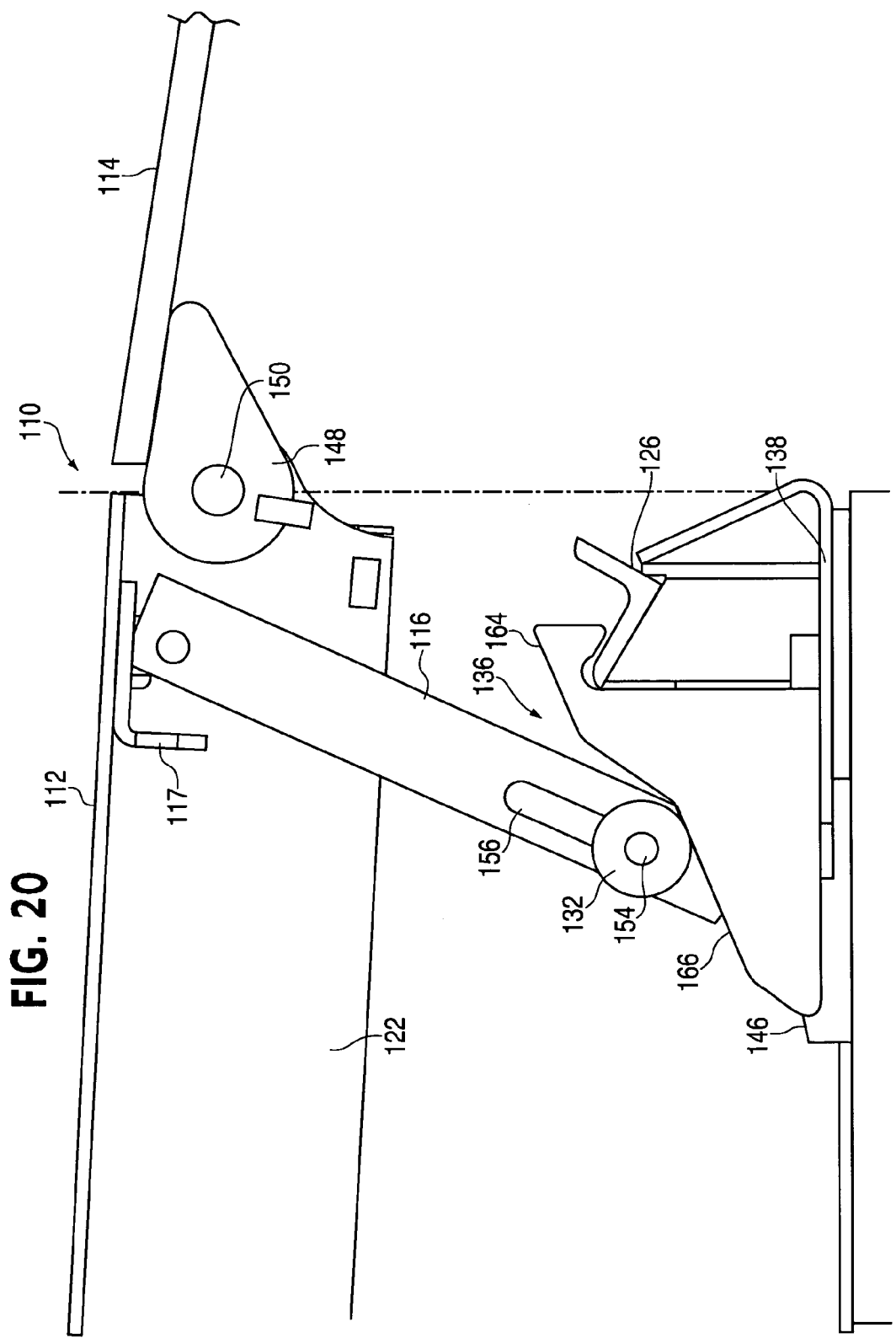
FIG. 20 is a side view of a second preferred embodiment of the invention where the support leg is in a partially retracted position.

An alternate embodiment of the present invention is shown in FIG. 20. The dock leveler 110 shown in FIG. 20 includes the support beam 122 and a lip 114 connected to support beam by a lip hinge 148 having a lip hinge pin 150. The lip 114 is pivotally connected to the support beam 122. Support leg 116 is pivotally connected to the underside of the ramp 112 via a bracket assembly 117.

A saddle-shaped support structure 126 is provided for supporting and/or aligning the support leg 116 when the support leg 116 is in the supporting position. Support leg 116 has a roller cam 132 attached to the support leg 116 by an axle 152 (shown in FIG. 21). The roller cam 132 is retained on the axle 152 by a hub 154 which may be a bolt head in some embodiments of the invention.

The axle 152 is permitted to move along the length of the support leg 116 via a slot 156. In embodiments where the axle 152 extends through the support leg 116, two slots 156 (shown in FIG. 21) may be provided to permit the axle 152 to move lengthwise along the support leg 116.

A leg guide 146 is mounted to the support structure 138 and/or pit floor 141. The leg guide 146 assists in the retraction of the leg 116 in that it provides a surface for the end 128 (shown in FIG. 21) of the support leg 116 to slide along.

Figure 21:
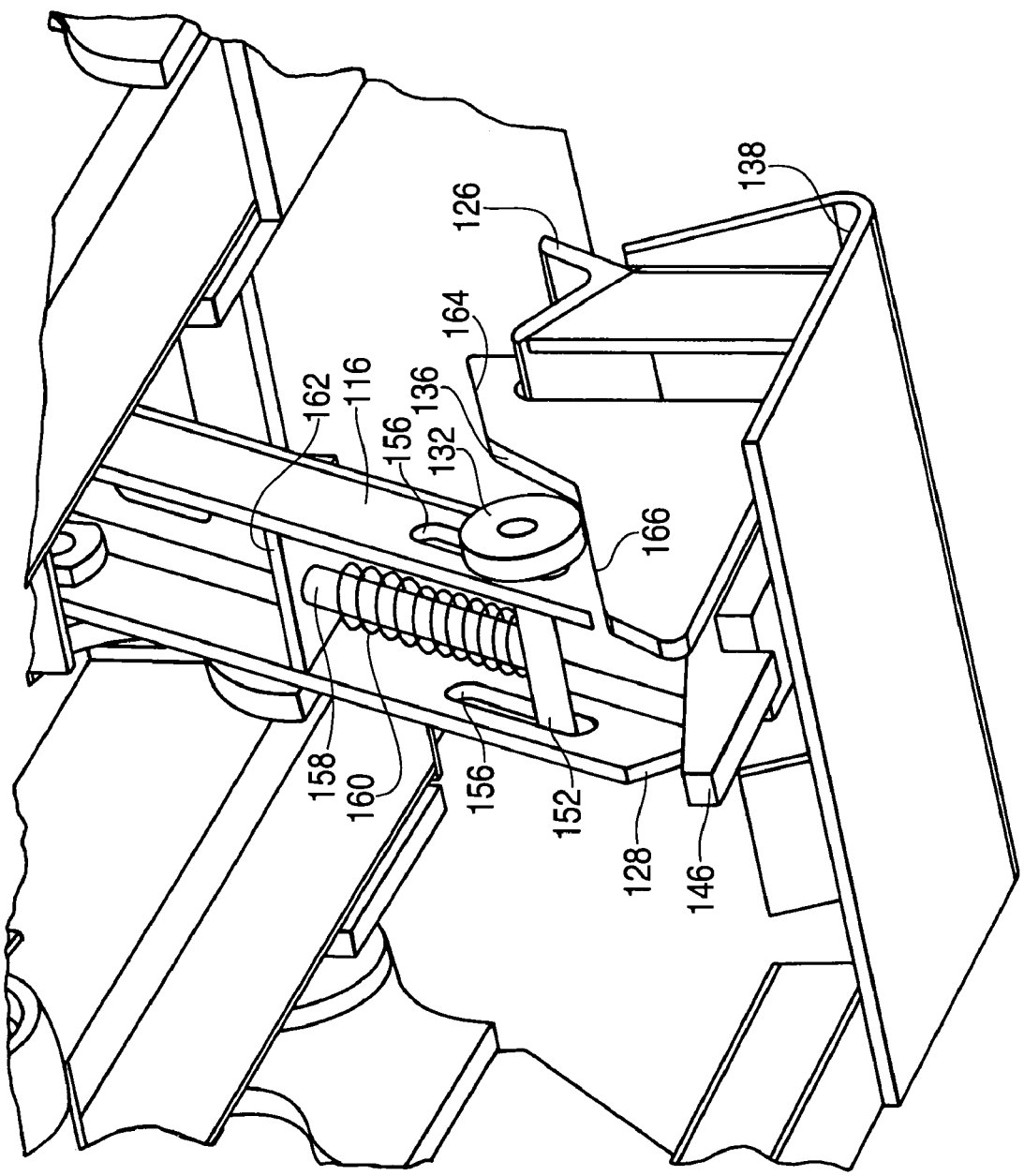
FIG. 21 is a perspective view of the support leg system of FIG. 20 showing the back portion of the support leg in a partially retracted position.

FIG. 21 is a rear perspective view of the embodiment shown in FIG. 20. Attached to the axle 152 is a spring rod 158. A spring 160 wraps around the spring rod 158 and is configured to urge the axle 152 to one end of the slot 156. The other end of the spring 160 urges against a bracket 162 attached to the support leg 116. In the embodiment shown in FIGS. 20 and 21, the camming surface 136 is fixedly attached to the camming surface support 138 structure rather than configured to move between two positions as described in the embodiment shown in FIGS. 12–19.

The roller cam 132 is not fixedly attached to the support leg 116 but is rather configured to move along the length of the slot 156. Because the axle 152 is biased by the spring 160 to one end of the slot 156 the roller cam 132 will remain at one end of the slot 156 unless acted upon by a force sufficient to overcome the spring 160. In the embodiment shown in FIGS. 20 and 21 the support leg 116 is biased to the forward position similar to the embodiments shown in FIGS. 12–19.

When the roller cam 132 moves downward slowly, and engages the camming surface 136 at a relatively slow speed, the inertia associated with the support leg 116 is insufficient to flex the spring 160 thus causing the roller cam 132 to stay in its biased position at one end of the slot 156. As the ramp continues downward under these conditions, the roller cam 132 will move along the camming surface 136 causing the retraction of the support leg 116. However, if the ramp moves downward at a rapid speed, the roller cam 132 will engage the camming surface 136 at a relatively high rate of speed and the weight and inertia associated with the support leg 116 will be sufficient to cause spring 160 to flex. The flexing of spring 160 will permit the axle 152 and the roller cam 132 to move along the slot 156 toward the other end of the slot 156. When the roller cam 132 moves along the slot 156 rather than traversing down the camming surface 136, the support leg 116 will tend to not retract. The length of the slot 156 is dimensioned to be long enough to cause the support leg 116 to engage the supporting surface 126 when the axle 152 is moved toward the opposite end of the slot 156 than the end to which the axle 152 is biased.

In some embodiments the present invention as shown in FIGS. 20 and 21, the camming surface 136 has two camming portions 164 and 166 (best shown in FIG. 20). Camming portion 164 is configured so that the roller cam 132 will engage the camming portion 164 when the support leg 116 is substantially in the support position. Camming portion 166 is configured so that if the support leg 116 is partially retracted and the dock leveler 110 were to suddenly and rapidly descend, the roller cam 132 could engage camming portion 166 at a relatively high rate of speed. If the roller cam 132 engaged the camming portion 166 at a high rate of speed, the axle 152 would move through the slot 156 rather than permitting the roller cam 132 to continue to roll down the camming surface 136 and continue to retract the support leg 116. When the axle 152 has deflected to the other end of the slot 156, the support leg 116 should not continue to retract but should engage a secondary support to support the ramp in a similar manner as described above with respect to FIG. 16.

The camming surface 166 is useful in instances where the dock leveler 110 is engaged to a vehicle with a low bed and the support leg 116 needs to be in a partially retracted position in order for the dock leveler 110 to engage the low bedded vehicle. If the low bedded vehicle were to drive off and cause the ramp to achieve free fall, the partially retracted support leg 116 could still support the ramp if the roller cam 132 engages the camming surface 166 at a high rate of speed and a secondary support position was achievable by the support leg 116, i.e. the dock leveler was equipped with a secondary support similar to that shown in 161 in FIG. 16. It will be appreciated that the support leg 116 can not have retracted past the last secondary support position and still provide support.

Figure 22:
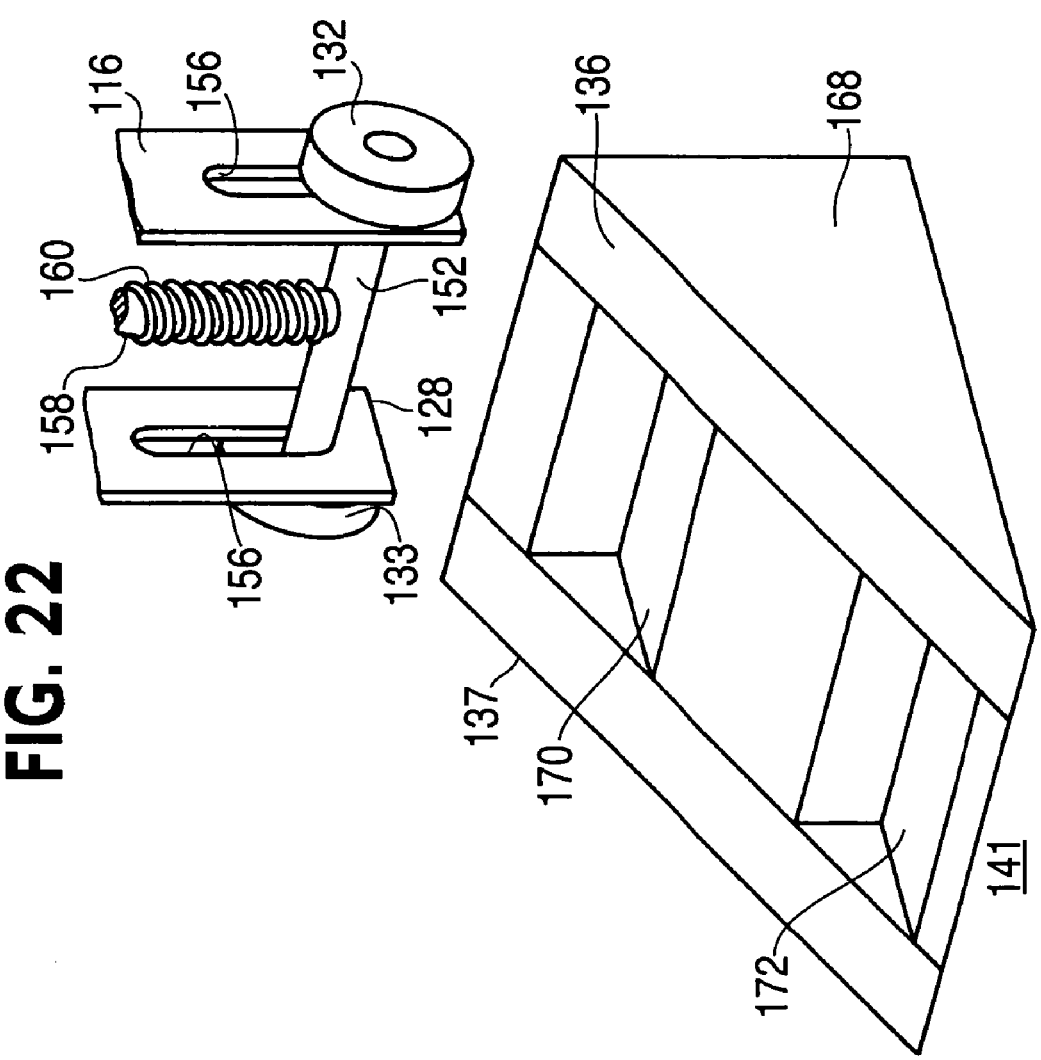
FIG. 22 is a perspective view of an alternate embodiment of the invention having two cams on a support leg and a modified camming surface and support structure.

A modified version of the embodiment of FIGS. 20 and 21 is shown in FIG. 22. In the embodiment shown in FIG. 22, the configuration and operation of the support leg 116, spring rod 158 and spring 160 is similar to the embodiments shown in FIGS. 20 and 21 and will not be repeated here. In the embodiment shown in FIG. 22, two roller cams 132 and 133 are attached to the axle 152. The axle 152 is mounted in the slots 156. A block 168 is located below the ramp on the pit floor 141 and located to contact the cams 132 and 133 and support leg 116. The block 168 includes two camming surfaces 136 and 137. The cams 132 and 133 will contact the camming surfaces 136 and 137 and cause the support leg 116 to retract when the ramp descends slower than a predetermined speed. If the ramp descends at or faster than the predetermined speed, the cams 132 and 133 will not move down the camming surfaces 136 and 137, but rather will move with the axle 152 along the slots 156 as the spring 160 deflects.

The block 168 contains two support areas 170 and 172. The support areas 170 and 172 are configured to support the end 128 of the support leg 116 when the cams 132 and 133 have moved along the slot 156 due to the ramp falling at a high speed. Other embodiments of the invention may have only one or more than two support areas. Multiple support areas may be provided so that if the support leg 116 has partially retracted and has moved to a location that would make one support position impossible to achieve, a second support position is available to support the ramp where it to suddenly descend rapidly and cause the spring 160 to flex.

The predetermined speed in which the ramp will descend to cause the axle 152 to slide along the slot 156 rather than cause the roller cams 132 and 133 to roll along the camming surfaces 136 and 137 can be selected according to the individual needs and requirements of the system. One skilled in the art will know what design choices, including the spring force for the spring 160, will be required to achieve the desired result of retraction or maintaining the support leg 116 in the supporting position under different dockleveler lowering speeds.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A support system for a dock leveler having a ramp and a lip comprising:
   a support leg apparatus attached to the ramp, said support leg apparatus comprising a support leg;
   a camming surface biased to an upward position and movable to a deflected position when the ramp descends at least as fast as a predetermined rate and said support leg apparatus engages said camming surface, wherein said camming surface is configured to remain in the upward position when the ramp descends slower than a predetermined rate; and,
   a lip holder coupled to said camming surface and configured to cause said camming surface to move to the deflected position when the ramp descends at any rate and when the lip engages said lip holder.

2. The support system of claim 1, wherein the support leg apparatus further comprises a cam aligned to engage said camming surface.

3. The support system of claim 2, wherein said cam is a roller cam.

4. The support system of claim 1, further comprising a support structure configured to support the ramp when said support structure engages said support leg.

5. The support system of claim 1, wherein said support leg is biased to a supporting position and further wherein said support leg is configured to move to a retracted position when said support leg apparatus engages said camming surface, the ramp descends slower than the predetermined rate, and the lip does not engage said lip holder.

6. The support system of claim 5, further comprising a leg guide.

7. The support system of claim 1, wherein the support leg apparatus is configured to support the ramp at one of a dock level position and at least one below dock level position.

8. A support system for a dock leveler having a ramp and a lip comprising:
   means for supporting the ramp attached to the ramp, said supporting means comprising a support leg;
   means for camming biased to an upward position and movable to a deflected position when the ramp descends at least as fast as a predetermined rate and said supporting means engages said camming means, wherein said camming means is configured to remain in the upward position when the ramp descends slower than a predetermined rate; and,
   means for holding the lip configured to cause said camming means to move to the deflected position when the ramp descends at any rate and when the lip engages said lip holding means.

9. The support system of claim 8, wherein the supporting means further comprises an engaging means aligned to engage said camming means.

10. The support system of claim 9, wherein said engaging means is a roller cam.

11. The support system of claim 8, further comprising means for supporting the support leg configured to support the ramp when said support leg supporting means engages said support leg.

12. The support system of claim 8, wherein said support leg is biased to a supporting position and further wherein said support leg is configured to move to a retracted position when said support leg apparatus engages said camming means, the ramp descends slower than the predetermined rate, and the lip does not engage said lip holding means.

13. The support system of claim 12, further comprising means for guiding the support leg.

14. The support system of claim 8, wherein the supporting means is configured to support the ramp at one of a dock level position and at least one below dock level position.

* * * * *